(12) United States Patent
Laliberte et al.

(10) Patent No.: US 12,731,440 B2
(45) Date of Patent: Sep. 8, 2026

(54) METHODS AND SYSTEMS USING DEPTH IMAGING FOR TRAINING AND DEPLOYING NEURAL NETWORKS FOR BIOMETRIC ANTI-SPOOFING

(71) Applicant: AIRY3D INC., Montreal (CA)

(72) Inventors: Nicolas Laliberte, Montreal (CA); Jimmy Leroux, Montreal (CA); Ji-Ho Cho, Montreal (CA)

(73) Assignee: AIRY3D INC., Montreal (CA)

( * ) Notice: Subject to any disclaimer, the term of this patent is extended or adjusted under 35 U.S.C. 154(b) by 309 days.

(21) Appl. No.: 18/703,190

(22) PCT Filed: Oct. 20, 2022

(86) PCT No.: PCT/CA2022/051551
§ 371 (c)(1),
(2) Date: Apr. 19, 2024

(87) PCT Pub. No.: WO2023/065038
PCT Pub. Date: Apr. 27, 2023

(65) Prior Publication Data

US 2024/0412563 A1 Dec. 12, 2024

Related U.S. Application Data

(60) Provisional application No. 63/264,070, filed on Nov. 15, 2021, provisional application No. 63/262,758, filed on Oct. 20, 2021.

(51) Int. Cl.
*G06V 40/40* (2022.01)
*G06T 3/18* (2024.01)
(Continued)

(52) U.S. Cl.
CPC ................ *G06V 40/40* (2022.01); *G06T 3/18* (2024.01); *G06T 7/50* (2017.01); *G06V 40/172* (2022.01);
(Continued)

(58) Field of Classification Search
CPC ........ G06V 40/40; G06V 40/172; G06T 7/50; G06T 3/18; G06T 2207/20084; G06T 2207/30201
See application file for complete search history.

(56) References Cited

U.S. PATENT DOCUMENTS 10,878,583 B2 * 12/2020 Schmid .................. G06N 3/045
10,929,977 B2 2/2021 Wang et al.
(Continued)

FOREIGN PATENT DOCUMENTS

WO 2019109182 6/2019
WO 2020243828 12/2020
(Continued)

OTHER PUBLICATIONS

Liu et al, "Disentangled Representation based Face Anti-Spoofing", 2020, 25th International Conference on Pattern Recognition (ICPR), pp. 2017-2024 (Year: 2020).*
(Continued)

*Primary Examiner* — David F Dunphy
(74) *Attorney, Agent, or Firm* — KDW Firm PLLC

(57) ABSTRACT

A method for spoofing detection in a biometric object can include receiving an image pair representing two different viewpoints of the biometric object, and inputting the image pair into a disparity encoder of a trained neural network configured to map the image pair to an encoded signal conveying disparity information associated with the image pair, wherein the disparity encoder was trained for disparity map estimation together with a disparity decoder, the dis-
(Continued)

parity encoder and the disparity decoder forming a disparity branch of the neural network during training. The method can also include inputting the encoded signal into a classification branch of the trained neural network configured to map the encoded signal to a probability that the biometric object is genuine or spoofed, wherein the classification branch was trained for spoofing detection together with the disparity branch. Techniques of training a neural network to perform image-based biometric anti-spoofing are also disclosed.

26 Claims, 17 Drawing Sheets

(51) Int. Cl.
*G06T 7/50* (2017.01)
*G06V 40/16* (2022.01)

(52) U.S. Cl.
CPC ............... *G06T 2207/20084* (2013.01); *G06T 2207/30201* (2013.01)

(56) References Cited

U.S. PATENT DOCUMENTS

2019/0213481 A1 7/2019 Godard et al.
2020/0041276 A1* 2/2020 Chakravarty ........ G06N 3/0495
2020/0351489 A1* 11/2020 Watson .................. G06N 20/00
2021/0110018 A1* 4/2021 Rowe ................... G06V 10/764
2021/0150818 A1 5/2021 Dedonato et al.
2021/0201526 A1 7/2021 Moloney et al.
2021/0319578 A1 10/2021 Casser et al.

FOREIGN PATENT DOCUMENTS

WO 2022/104467 5/2022
WO 2022/150903 7/2022

OTHER PUBLICATIONS

The Extended European Search Report dated Jun. 20, 2025 in European Application No. 22882151.8 (10 pages).

Li et al., "An Effective Face Anti-Spoofing Method via Stereo Matching", IEEE Signal Processing Letters, IEEE, vol. 28, Apr. 13, 2021, pp. 847-857 (2021).

Ramachandra et al., "Presentation Attack Detection Methods for Face Recognition Systems", ACM Computing Surveys (CSUR), Association for Computing Machinery, vol. 50, No. 1, Mar. 20, 2017, pp. 1-37 (2017).

Wu et al., "Light Field Image Processing: An Overview", IEEE Journal of Selected Topics in Signal Processing, IEEE vol. 11, No. 7, Oct. 1, 2017 (Oct. 1, 2017), pp. 926-954 (2017).

Goldman et al., "Learn Stereo, Infer Mono: Siamese Networks for Self-Supervised, Monocular, Depth Estimation," IEEE Conference on Computer Vision and Pattern Recognition Workshops, CVPR Workshops 2019, Long Beach, CA, USA, Jun. 16-20, 2019. pp. 2886-2895.

International Search Report and Written Opinion in International Application No. PCT/CA2022/051551, mailed on Dec. 22, 2022, 19 pages.

Kunnath, "Depth from Defocus using Angle Sensitive Pixels based on a Transmissive Diffraction Mask," A thesis submitted in partial fulfillment for the degree of Master of Science, McGill University, Jan. 2018, 66 pages.

Wu et al., "Single-Shot Face Anti-Spoofing for Dual Pixel Camera," in IEEE Transactions on Information Forensics and Security, in IEEE Transactions on Information Forensics and Security, 2021, 16:1440-1451.

* cited by examiner 100
102
104
θ=0
118
122
124
120
116
108
110
$130_1$ $130_2$ $130_3$ $130_4$ $130_5$ $130_6$ 112
132
100
102
104
θ=θmax
118
122
124
120
116
108
110
$130_1$ $130_2$ $130_3$ $130_4$ $130_5$ $130_6$ 112
132
100
102
104
θ=-θmax
118
122
124
120
116
108
110
$130_1$ $130_2$ $130_3$ $130_4$ $130_5$ $130_6$ 112
132

METHODS AND SYSTEMS USING DEPTH IMAGING FOR TRAINING AND DEPLOYING NEURAL NETWORKS FOR BIOMETRIC ANTI-SPOOFING

CROSS REFERENCE TO RELATED APPLICATIONS

The present application is a national stage application under 35 U.S.C. § 371 of International Patent Application No. PCT/CA2022/051551, filed on Oct. 20, 2022, which claims priority to U.S. Provisional Patent Application No. 63/262,758, filed on Oct. 20, 2021 and U.S. Provisional Patent Application No. 63/264,070, filed on Nov. 15, 2021. The above-referenced patent applications are incorporated herein by reference in their entireties.

TECHNICAL FIELD

The technical field generally relates to imaging technology, and more particularly, to methods and systems using depth imaging for training and deploying neural networks for face and other biometric anti-spoofing detection.

BACKGROUND

As biometrics systems become more widely used in common applications, such as mobile phone unlock and access control, spoofing attacks will become an ever-larger threat. Among biometric identification, methods for face recognition and authentication are increasingly popular because they are touchless and convenient. However, current face detection technologies are vulnerable to spoofing attacks. Spoofing of authorized users may be attempted using various techniques, such as printed photographs and video replays. As a result, existing facial recognition systems based on standard two-dimensional (2D) imaging techniques can have significant security vulnerabilities. To prevent spoofing attempts, three-dimensional (3D) imaging techniques may be used to add depth information to standard 2D imaging.

SUMMARY

The present description generally relates to neural-network-based face and other biometric anti-spoofing techniques using depth imaging, for example, monocular depth imaging systems and methods using a transmissive diffraction mask (TDM). In TDM-based imaging systems and methods, the TDM introduces an angle-dependent modulation to the incident light by diffracting it based on its angle of incidence.

In accordance with an aspect, there is provided a method of training a neural network to perform image-based biometric anti-spoofing based on a training dataset including a set of training image pairs and a respective set of training labels, wherein each training image pair includes a first training image and a second training image representing two different viewpoints of a training biometric object, and wherein each training label identifies whether the training biometric object associated with the respective training image pair is genuine or spoofed, the method including: training a disparity branch of the neural network for disparity map estimation, the disparity branch including a disparity encoder and a disparity decoder, the training including: mapping, with the disparity encoder, each training image pair to an encoded training signal conveying disparity information associated with the training image pair; and mapping, with the disparity decoder, each encoded training signal to a training disparity map associated with the respective training image pair; and training a classification branch of the neural network for spoofing detection, the training including mapping, with the classification branch, each encoded training signal outputted by the disparity encoder to a predicted spoof probability that the training biometric object associated with the respective training image pair is genuine or spoofed.

In some embodiments, the training biometric object includes at least a portion of a face of a person.

In some embodiments, training the disparity branch is performed in an unsupervised manner without ground-truth disparity information about the set of training image pairs.

In some embodiments, the disparity branch has a Siamese architecture including a pair of sub-branches with shared weights, the pair of sub-branches including a first sub-branch and a second sub-branch configured to receive the first training image and the second training image of each training image pair, respectively.

In some embodiments, training the disparity branch of the neural network includes computing, for each training image pair, a reconstruction loss based on the training disparity map estimated by the disparity branch. In some embodiments, computing the reconstruction loss for each training image pair includes generating, from the training disparity map and one of the first and second training images, a reconstructed version of the other one of the first and second training images; and calculating the reconstruction loss based on an image similarity measure between the other one of the first and second training images and the reconstructed version thereof. In some embodiments, generating the reconstructed version of the other one of the first and second training images includes performing a warping operation using the training disparity map on the one of the first and second training images.

In some embodiments, for each training image pair: the disparity information conveyed by the respective encoded training signal includes a lower-resolution sub-disparity map associated with the training image pair; the disparity decoder includes a hierarchy of decoding blocks corresponding to a hierarchy of scales, the hierarchy of decoding blocks being configured to receive and perform an upsampling operation on the lower-resolution sub-disparity map to generate the training disparity map, the upsampling operation including generating a plurality of upsampled sub-disparity maps of increasingly finer resolution by upsampling the lower-resolution sub-disparity map successively through the hierarchy of decoding blocks, the plurality of upsampled sub-disparity maps including a plurality of intermediate upsampled sub-disparity maps and a final upsampled sub-disparity map, the final upsampled sub-disparity map being generated by a last one of the hierarchy of decoding blocks and forming the training disparity map; and computing the reconstruction loss is further based on the lower-resolution sub-disparity map and the plurality of intermediate upsampled sub-disparity maps.

In some embodiments, for each training image pair: the disparity information conveyed by the respective encoded training signal further includes a lower-resolution feature map pair associated with, and of coarser resolution than, the training image pair; the upsampling operation further includes generating a plurality of upsampled feature map pairs of increasingly finer resolution by upsampling the lower-resolution feature map pair successively through the hierarchy of decoding blocks, each upsampled feature map pair including a first upsampled feature map and a second upsampled feature map; and generating each intermediate upsampled sub-disparity map by the respective decoder block in the hierarchy includes: inputting an input sub-disparity map into the respective decoder block, the input sub-disparity map being, depending on the scale of the respective decoding block, the lower-resolution sub-disparity map or the intermediate upsampled sub-disparity map generated by the previous decoder block in the hierarchy; upsampling the input sub-disparity map to generate a base sub-disparity map; generating, from the base sub-disparity map and one of the first and second upsampled feature maps of the upsampled feature map pair generated by the respective decoder block, a reconstructed version of the other one of the first and second upsampled feature maps; computing a residual sub-disparity map between the other one of the first and second upsampled feature maps and the reconstructed version thereof; and refining the base sub-disparity map using the residual sub-disparity map, to obtain the intermediate upsampled sub-disparity map. In some embodiments, generating the reconstructed version of the other one of the first and second upsampled feature maps includes performing a warping operation using the base sub-disparity map on the one of the first and second upsampled feature maps.

In some embodiments, training the classification branch of the neural network includes computing, for each training image pair, a classification loss between the predicted spoof probability and the training label associated with the training image pair.

In some embodiments, training the disparity branch and training the classification branch are performed as a multi-stage training operation including: a first training stage, during which the disparity branch is pre-trained and the classification branch is not trained; and a second training stage, following the first training stage, during which the pre-trained disparity branch and the untrained classification branch are trained together.

In some embodiments, each training image pair was captured with an imaging system including an image sensor and an optical encoder disposed over the image sensor, the image sensor being configured to detect, as captured image data, light incident from the training biometric object having passed through the optical encoder, the optical encoder being configured to encode angle-of-incidence-dependent information about the incident light, and wherein the captured image data includes: a first set of pixel responses corresponding to a first set of pixels of the image sensor, wherein the first set of pixel responses forms the first training image of the training image pair; and a second set of pixel responses corresponding to a second set of pixels of the image sensor, the first set of pixel responses and the second set of pixel responses varying differently from each other as a function of angle of incidence, wherein the second set of pixel responses forms the second training image of the training image pair.

In some embodiments, the optical encoder includes a transmissive diffraction mask (TDM), the TDM being configured to diffract the light incident from the training biometric object to generate diffracted light, the diffracted light having the angle-dependent information encoded therein for detection by the image sensor as the captured image data.

In some embodiments, the optical encoder includes an array of microlenses, each microlens covering at least two pixels of the image sensor.

In some embodiments, each training image pair was captured with an imaging system including a first image capture device and a second capture device positioned in a stereoscopic arrangement with respect to the training biometric object, the first image capture device being configured to capture the first training image of each training image pair and the second image capture device being configured to capture the second training image of each training image pair.

In some embodiments, the method further includes capturing the set of training image pairs with the imaging system; and labeling the training image pairs by assigning the training labels thereto.

In accordance with another aspect, there is provided a non-transitory computer readable storage medium having stored thereon computer readable instructions which, when executed by a processor, cause the processor to perform a method of training a neural network to perform image-based biometric anti-spoofing as disclosed herein.

In accordance with another aspect, there is provided a non-transitory computer readable storage medium having stored thereon computer readable instructions which, when executed by a processor, cause the processor to perform method of training a neural network to perform image-based biometric anti-spoofing based on a training dataset including a set of training image pairs and a respective set of training labels, wherein each training image pair includes a first training image and a second training image representing two different viewpoints of a training biometric object, and wherein each training label identifies whether the training biometric object associated with the respective training image pair is genuine or spoofed, the method including: training a disparity branch of the neural network for disparity map estimation, the disparity branch including a disparity encoder and a disparity decoder, the training including: mapping, with the disparity encoder, each training image pair to an encoded training signal conveying disparity information associated with the training image pair; and mapping, with the disparity decoder, each encoded training signal to a training disparity map associated with the respective training image pair; and training a classification branch of the neural network for spoofing detection, the training including mapping, with the classification branch, each encoded training signal outputted by the disparity encoder to a predicted spoof probability that the training biometric object associated with the respective training image pair is genuine or spoofed.

In accordance with another aspect, there is provided a training system for training a neural network to perform image-based biometric anti-spoofing based on a training dataset including a set of training image pairs and a respective set of training labels, wherein each training image pair includes a first training image and a second training image representing two different viewpoints of a training biometric object, and wherein each training label identifies whether the training biometric object associated with the respective training image pair is genuine or spoofed, the training system including: a processor; and a non-transitory computer readable storage medium operatively coupled to the processor, the non-transitory computer readable storage medium having stored thereon computer readable instructions which, when executed by the processor, cause the processor to perform operations including: training a disparity branch of the neural network for disparity map estimation, the disparity branch including a disparity encoder and a disparity decoder, the training including: mapping, with the disparity encoder, each training image pair to an encoded training signal conveying disparity information associated with the training image pair; and mapping, with the disparity decoder, each encoded training signal to a training disparity map associated with the respective training image pair; and training a classification branch of the neural network for spoofing detection, the training including mapping, with the classification branch, each encoded training signal outputted by the disparity encoder to a predicted spoof probability that the training biometric object associated with the respective training image pair is genuine or spoofed.

In some embodiments, the training system further includes an imaging system configured to capture the set of training image pairs and send the set of training image pairs to the processor. In some embodiments, the imaging system includes an image sensor including an array of pixels, and an optical encoder disposed over the image sensor and having an angular response, the image sensor being configured to detect, as captured image data, light incident from the training biometric object having passed through the optical encoder, and the optical encoder being configured to encode angle-of-incidence-dependent information about the incident light, wherein the captured image data includes, for each training image pair: a first set of pixel responses corresponding to a first set of pixels of the array of pixels of the image sensor, wherein the first set of pixel responses forms the first training image of the training image pair; and a second set of pixel responses corresponding to a second set of pixels of the array of pixels of the image sensor, the first set of pixel responses and the second set of pixel responses varying differently from each other as a function of angle of incidence, wherein the second set of pixel responses forms the second training image of the training image pair.

In some embodiments, the optical encoder includes a transmissive diffraction mask (TDM), the TDM being configured to diffract the light incident from the training biometric object to generate diffracted light, the diffracted light having the angle-dependent information encoded therein for detection by the image sensor as the captured image data. In some embodiments, the TDM includes a binary phase diffraction grating including a series of alternating ridges and grooves extending along a grating axis at a grating period. In some embodiments, the image sensor has a pixel pitch along the grating axis, the pixel pitch being half of the grating period.

In some embodiments, the optical encoder includes an array of microlenses, each microlens covering at least two pixels of the image sensor.

In some embodiments, the imaging system includes a first image capture device and a second capture device positioned in a stereoscopic arrangement with respect to the training biometric object, the first image capture device being configured to capture the first training image of each training image pair and the second image capture device being configured to capture the second training image of each training image pair.

In some embodiments, the training biometric object includes at least a portion of a face of a person.

In some embodiments, the processor is configured to train the disparity branch in an unsupervised manner without ground-truth disparity information about the set of training image pairs.

In some embodiments, the disparity branch has a Siamese architecture including a pair of sub-branches with shared weights, the pair of sub-branches including a first sub-branch and a second sub-branch configured to receive the first training image and the second training image of each training image pair, respectively.

In some embodiments, training the disparity branch of the neural network includes computing, for each training image pair, a reconstruction loss based on the training disparity map estimated by the disparity branch. In some embodiments, computing the reconstruction loss for each training image pair includes generating, from the training disparity map and one of the first and second training images, a reconstructed version of the other one of the first and second training images; and calculating the reconstruction loss based on an image similarity measure between the other one of the first and second training images and the reconstructed version thereof. In some embodiments, generating the reconstructed version of the other one of the first and second training images includes performing a warping operation using the training disparity map on the one of the first and second training images.

In some embodiments, for each training image pair: the disparity information conveyed by the respective encoded training signal includes a lower-resolution sub-disparity map associated with the training image pair; the disparity decoder includes a hierarchy of decoding blocks corresponding to a hierarchy of scales, the hierarchy of decoding blocks being configured to receive and perform an upsampling operation on the lower-resolution sub-disparity map to generate the training disparity map, the upsampling operation including generating a plurality of upsampled sub-disparity maps of increasingly finer resolution by upsampling the lower-resolution sub-disparity map successively through the hierarchy of decoding blocks, the plurality of upsampled sub-disparity maps including a plurality of intermediate upsampled sub-disparity maps and a final upsampled sub-disparity map, the final upsampled sub-disparity map being generated by a last one of the hierarchy of decoding blocks and forming the training disparity map; and computing the reconstruction loss is further based on the lower-resolution sub-disparity map and the plurality of intermediate upsampled sub-disparity maps.

In some embodiments, for each training image pair: the disparity information conveyed by the respective encoded training signal further includes a lower-resolution feature map pair associated with, and of coarser resolution than, the training image pair; the upsampling operation further includes generating a plurality of upsampled feature map pairs of increasingly finer resolution by upsampling the lower-resolution feature map pair successively through the hierarchy of decoding blocks, each upsampled feature map pair including a first upsampled feature map and a second upsampled feature map; and generating each intermediate upsampled sub-disparity map by the respective decoder block in the hierarchy includes: inputting an input sub-disparity map into the respective decoder block, the input sub-disparity map being, depending on the scale of the respective decoding block, the lower-resolution sub-disparity map or the intermediate upsampled sub-disparity map generated by the previous decoder block in the hierarchy; upsampling the input sub-disparity map to generate a base sub-disparity map; generating, from the base sub-disparity map and one of the first and second upsampled feature maps of the upsampled feature map pair generated by the respective decoder block, a reconstructed version of the other one of the first and second upsampled feature maps; computing a residual sub-disparity map between the other one of the first and second upsampled feature maps and the reconstructed version thereof; and refining the base sub-disparity map using the residual sub-disparity map, to obtain the intermediate upsampled sub-disparity map. In some embodiments, generating the reconstructed version of the other one of the first and second upsampled feature maps includes performing a warping operation using the upsampled sub-disparity map on the one of the first and second upsampled feature maps.

In some embodiments, training the classification branch of the neural network includes computing, for each training image pair, a classification loss between the predicted spoof probability and the training label associated with the training image pair.

In some embodiments, the processor is configured to perform the training of the disparity branch and the training of the classification branch are performed as a multistage training operation including: a first training stage, during which the disparity branch is pre-trained and the classification branch is not trained; and a second training stage, following the first training stage, during which the pre-trained disparity branch and the untrained classification branch are trained together.

In accordance with another aspect, there is provided a method for spoofing detection in a test biometric object, including: receiving a test image pair including a first test image and a second test image representing two different viewpoints of the test biometric object; mapping, using a disparity encoder of a trained neural network, the test image pair to an encoded test signal conveying disparity information associated with the test image pair, wherein the disparity encoder was trained for disparity map estimation together with a disparity decoder as a disparity branch of the neural network; and mapping, using a classification branch of the trained neural network, the encoded test signal to a predicted spoof probability that the test biometric object is genuine or spoofed, wherein the classification branch was trained for spoofing detection together with the disparity branch.

In some embodiments, the test biometric object includes at least a portion of a face of a person.

In some embodiments, the disparity encoder has a Siamese architecture including a pair of sub-branches with shared weights, the pair of sub-branches including a first sub-branch and a second sub-branch configured to receive the first test image and the second test image of the test image pair, respectively.

In some embodiments, the test image pair was captured with an imaging system including an image sensor and an optical encoder disposed over the image sensor, the image sensor being configured to detect, as captured image data, light incident from the test biometric object having passed through the optical encoder, the optical encoder being configured to encode angle-of-incidence-dependent information about the incident light, and wherein the captured image data includes a first set of pixel responses corresponding to a first set of pixels of the image sensor, wherein the first set of pixel responses forms the first test image of the test image pair; and a second set of pixel responses corresponding to a second set of pixels of the image sensor, the first set of pixel responses and the second set of pixel responses varying differently from each other as a function of angle of incidence, wherein the second set of pixel responses forms the second test image of the test image pair.

In some embodiments, the optical encoder includes a transmissive diffraction mask (TDM), the TDM being configured to diffract the light incident from the test biometric object to generate diffracted light, the diffracted light having the angle-dependent information encoded therein for detection by the image sensor as the captured image data. In some embodiments, the optical encoder includes an array of microlenses, each microlens covering at least two pixels of the image sensor. In some embodiments, the test image pair was captured with a stereoscopic imaging system including a first image capture device configured to capture the first test image of the test image pair and a second image capture device to capture the second test image of the test image pair.

In some embodiments, the method further includes outputting a spoof detection result for the test image based on the predicted spoof probability. In some embodiments, outputting the spoof detection result includes generating an alert in response to a prediction that the test biometric object is spoofed.

In some embodiments, the method further includes capturing the test image pair.

In accordance with another aspect, there is provided a non-transitory computer readable storage medium having stored thereon computer readable instructions that, when executed by a processor, cause the processor to perform a method for spoofing detection in a test biometric object as disclosed herein.

In accordance with another aspect, there is provided non-transitory computer readable storage medium having stored thereon computer readable instructions that, when executed by a processor, cause the processor to perform a method for spoofing detection in a test biometric object, the method including: receiving a test image pair including a first test image and a second test image representing two different viewpoints of the test biometric object; inputting the test image pair into a disparity encoder of a trained neural network, the trained neural network being configured to map the test image pair to an encoded test signal conveying disparity information associated with the test image pair, wherein the disparity encoder was trained for disparity map estimation together with a disparity decoder, the disparity encoder and the disparity decoder forming a disparity branch of the neural network during training; and inputting the encoded test signal into a classification branch of the trained neural network, the classification branch being configured to map the encoded test signal to a predicted spoof probability that the test biometric object is genuine or spoofed, wherein the classification branch was trained for spoofing detection together with the disparity branch.

In accordance with another aspect, there is provided a system for spoofing detection in a test biometric object, the system including: a processor; and a non-transitory computer readable storage medium operatively coupled to the processor, the non-transitory computer readable storage medium having stored thereon computer readable instructions which, when executed by the processor, cause the processor to perform operations including: receiving a test image pair including a first test image and a second test image representing two different viewpoints of the test biometric object; inputting the test image pair into a disparity encoder of a trained neural network, the disparity encoder being configured to map the test image pair to an encoded test signal conveying disparity information associated with the test image pair, wherein the disparity encoder was trained for disparity map estimation together with a disparity decoder as a disparity branch of the neural network; and inputting the encoded test signal into a classification branch of the trained neural network, the classification branch being configured to map the encoded test signal to a predicted spoof probability that the test biometric object is genuine or spoofed, wherein the classification branch was trained for spoofing detection together with the disparity branch.

In some embodiments, the system for spoofing detection further includes an imaging system configured to capture the test image pair and send the test image pair to the processor. In some embodiments, the imaging system includes an image sensor including an array of pixels, and an optical encoder disposed over the image sensor and having an angular response, the image sensor being configured to detect, as captured image data, light incident from the test biometric object having passed through the optical encoder, and the optical encoder being configured to encode angle-of-incidence-dependent information about the incident light, wherein the captured image data includes a first set of pixel responses corresponding to a first set of pixels of the array of pixels of the image sensor, wherein the first set of pixel responses forms the first test image of the test image pair; and a second set of pixel responses corresponding to a second set of pixels of the array of pixels of the image sensor, the first set of pixel responses and the second set of pixel responses varying differently from each other as a function of angle of incidence, wherein the second set of pixel responses forms the second test image of the test image pair.

In some embodiments, the optical encoder includes a transmissive diffraction mask (TDM), the TDM being configured to diffract the light incident from the test biometric object to generate diffracted light, the diffracted light having the angle-dependent information encoded therein for detection by the image sensor as the captured image data. In some embodiments, the TDM includes a binary phase diffraction grating including a series of alternating ridges and grooves extending along a grating axis at a grating period. In some embodiments, the image sensor has a pixel pitch along the grating axis, the pixel pitch being half of the grating period. In some embodiments, the optical encoder includes an array of microlenses, each microlens covering at least two pixels of the image sensor.

In some embodiments, the imaging system includes a first image capture device and a second capture device positioned in a stereoscopic arrangement with respect to the test biometric object, the first image capture device being configured to capture the first test image of the test image pair and the second image capture device being configured to capture the second test image of the test image pair.

In some embodiments, the test biometric object includes at least a portion of a face of a person.

In some embodiments, the disparity encoder has a Siamese architecture including a pair of sub-branches with shared weights, the pair of sub-branches including a first sub-branch and a second sub-branch configured to receive the first test image and the second test image of the test image pair, respectively.

In some embodiments, the operations performed by the processor further includes outputting a spoof detection result for the test image based on the predicted spoof probability. In some embodiments, outputting the spoof detection result includes generating an alert in response to a prediction that the test biometric object is spoofed.

In accordance with another aspect, there is provided a method of training a neural network for disparity map estimation, the neural network including a disparity encoder and a disparity decoder, the training being based on a training dataset including a set of training image pairs, each training image pair including a first training image and a second training image representing two different viewpoints of a training biometric object, the method including: mapping, with the disparity encoder, each training image pair to an encoded training signal including a lower-resolution feature map pair associated with, and of coarser resolution than, the training image pair, and a lower-resolution sub-disparity map associated with the lower-resolution feature map pair; mapping, with the disparity decoder, each encoded training signal to a training disparity map associated with the respective training image pair, wherein the disparity decoder includes a hierarchy of decoding blocks corresponding to a hierarchy of scales, the hierarchy of decoding blocks being configured to receive and perform an upsampling operation on each encoded training signal to generate the training disparity map; and computing, for each training image pair, a reconstruction loss based on the training disparity map. The upsampling operation includes generating a plurality of upsampled feature map pairs of increasingly finer resolution by upsampling the lower-resolution feature map pair successively through the hierarchy of decoding blocks, each upsampled feature map pair including a first upsampled feature map and a second upsampled feature map; and generating a plurality of upsampled sub-disparity maps of increasingly finer resolution by upsampling the lower-resolution sub-disparity map successively through the hierarchy of decoding blocks, the plurality of upsampled sub-disparity maps including a plurality of intermediate upsampled sub-disparity maps and a final upsampled sub-disparity map, the final upsampled sub-disparity map being generated by a last one of the hierarchy of decoding blocks and forming the training disparity map, wherein generating each intermediate upsampled sub-disparity map by the respective decoder block in the hierarchy includes: inputting an input sub-disparity map into the respective decoder block, the input sub-disparity map being, depending on the scale of the respective decoding block, the lower-resolution sub-disparity map or the intermediate upsampled sub-disparity map generated by the previous decoder block in the hierarchy; upsampling the input sub-disparity map to generate a base sub-disparity map; generating, from the base sub-disparity map and one of the first and second upsampled feature maps of the upsampled feature map pair generated by the respective decoder block, a reconstructed version of the other one of the first and second upsampled feature maps; computing a residual sub-disparity map between the other one of the first and second upsampled feature maps and the reconstructed version thereof, and refining the base sub-disparity map using the residual sub-disparity map, to obtain the intermediate upsampled sub-disparity map.

In some embodiments, the neural network has a Siamese architecture including a pair of sub-branches with shared weights extending through the encoder and the decoder, the pair of sub-branches including a first sub-branch and a second sub-branch configured to receive the first training image and the second training image of each training image pair, respectively.

In some embodiments, the disparity encoder includes a hierarchy of encoding blocks configured to receive and perform a downsampling operation on each training image pair to generate the lower-resolution feature map pair and the lower-resolution sub-disparity map, the downsampling operation including generating a plurality of downsampled feature map pairs of increasingly coarser resolution by downsampling the training image pair successively through the hierarchy of encoding blocks, the plurality of downsampled feature map pairs including a plurality of intermediate downsampled feature map pairs and a final downsampled feature map pair, the final downsampled feature map pair being generated by a last one of the hierarchy of encoding blocks and forming the lower-resolution feature map pair, wherein the plurality of intermediate downsampled feature map pair are used, via skip connections between the disparity encoder and the disparity decoder, in generating the plurality of intermediate upsampled feature map pairs.

In some embodiments, computing the reconstruction loss for each training image pair includes generating, from the training disparity map and one of the first and second training images, a reconstructed version of the other one of the first and second training images; and calculating the reconstruction loss based on an image similarity measure between the other one of the first and second training images and the reconstructed version thereof. In some embodiments, generating the reconstructed version of the other one of the first and second training images includes performing a warping operation using the training disparity map on the one of the first and second training images.

In some embodiments, computing the reconstruction loss for each training image pair is further based on the lower-resolution sub-disparity map and the plurality of intermediate upsampled sub-disparity maps. In some embodiments, generating the reconstructed version of the other one of the first and second upsampled feature maps includes performing a warping operation using the base sub-disparity map on the one of the first and second upsampled feature maps.

In some embodiments, each training image pair was captured with an imaging system including an image sensor and an optical encoder disposed over the image sensor, the image sensor being configured to detect, as captured image data, light incident from the training biometric object having passed through the optical encoder, the optical encoder being configured to encode angle-of-incidence-dependent information about the incident light, and wherein the captured image data includes a first set of pixel responses corresponding to a first set of pixels of the image sensor, wherein the first set of pixel responses forms the first training image of the training image pair; and a second set of pixel responses corresponding to a second set of pixels of the image sensor, the first set of pixel responses and the second set of pixel responses varying differently from each other as a function of angle of incidence, wherein the second set of pixel responses forms the second training image of the training image pair. In some embodiments, the optical encoder includes a transmissive diffraction mask (TDM), the TDM being configured to diffract the light incident from the training biometric object to generate diffracted light, the diffracted light having the angle-dependent information encoded therein for detection by the image sensor as the captured image data. In some embodiments, the optical encoder includes an array of microlenses, each microlens covering at least two pixels of the image sensor. In some embodiments, each training image pair was captured with an imaging system including a first image capture device and a second capture device positioned in a stereoscopic arrangement with respect to the training biometric object, the first image capture device being configured to capture the first training image of each training image pair and the second image capture device being configured to capture the second training image of each training image pair. In some embodiments, the method further includes capturing the set of training image pairs with the imaging system.

In accordance with another aspect, there is provided a non-transitory computer readable storage medium having stored thereon computer readable instructions which, when executed by a processor, cause the processor to perform a method of training the neural network for disparity map estimation as disclosed herein.

In accordance with another aspect, there is provided a training system for training a neural network for disparity map estimation, the neural network including a disparity encoder and a disparity decoder, the training being based on a training dataset including a set of training image pairs, each training image pair including a first training image and a second training image representing two different viewpoints of a training biometric object, the training system including: a processor; and a non-transitory computer readable storage medium operatively coupled to the processor, the non-transitory computer readable storage medium having stored thereon computer readable instructions which, when executed by the processor, cause the processor to perform operations including: mapping, with the disparity encoder, each training image pair to an encoded training signal including a lower-resolution feature map pair associated with, and of coarser resolution than, the training image pair, and a lower-resolution sub-disparity map associated with the lower-resolution feature map pair; mapping, with the disparity decoder, each encoded training signal to a training disparity map associated with the respective training image pair, wherein the disparity decoder includes a hierarchy of decoding blocks corresponding to a hierarchy of scales, the hierarchy of decoding blocks being configured to receive and perform an upsampling operation on each encoded training signal to generate the training disparity map; and computing, for each training image pair, a reconstruction loss based on the training disparity map. The upsampling operation includes generating a plurality of upsampled feature map pairs of increasingly finer resolution by upsampling the lower-resolution feature map pair successively through the hierarchy of decoding blocks, each upsampled feature map pair including a first upsampled feature map and a second upsampled feature map; and generating a plurality of upsampled sub-disparity maps of increasingly finer resolution by upsampling the lower-resolution sub-disparity map successively through the hierarchy of decoding blocks, the plurality of upsampled sub-disparity maps including a plurality of intermediate upsampled sub-disparity maps and a final upsampled sub-disparity map, the final upsampled sub-disparity map being generated by a last one of the hierarchy of decoding blocks and forming the training disparity map, wherein generating each intermediate upsampled sub-disparity map by the respective decoder block in the hierarchy includes: inputting an input sub-disparity map into the respective decoder block, the input sub-disparity map being, depending on the scale of the respective decoding block, the lower-resolution sub-disparity map or the intermediate upsampled sub-disparity map generated by the previous decoder block in the hierarchy; upsampling the input sub-disparity map to generate a base upsampled sub-disparity map; generating, from the base sub-disparity map and one of the first and second upsampled feature maps of the upsampled feature map pair generated by the respective decoder block, a reconstructed version of the other one of the first and second upsampled feature maps; computing a residual sub-disparity map between the other one of the first and second upsampled feature maps and the reconstructed version thereof; and refining the base sub-disparity map using the residual sub-disparity map, to obtain the intermediate upsampled sub-disparity map.

In some embodiments, the training system further includes an imaging system configured to capture the set of training image pairs and send the set of training image pairs to the processor. In some embodiments, the imaging system includes an image sensor including an array of pixels, and an optical encoder disposed over the image sensor and having an angular response, the image sensor being configured to detect, as captured image data, light incident from the training biometric object having passed through the optical encoder, and the optical encoder being configured to encode angle-of-incidence-dependent information about the incident light, wherein the captured image data includes a first set of pixel responses corresponding to a first set of pixels of the array of pixels of the image sensor, wherein the first set of pixel responses forms the first training image of the training image pair; and a second set of pixel responses corresponding to a second set of pixels of the array of pixels of the image sensor, the first set of pixel responses and the second set of pixel responses varying differently from each other as a function of angle of incidence, wherein the second set of pixel responses forms the second training image of the training image pair. In some embodiments, the optical encoder includes a transmissive diffraction mask (TDM), the TDM being configured to diffract the light incident from the training biometric object to generate diffracted light, the diffracted light having the angle-dependent information encoded therein for detection by the image sensor as the captured image data. In some embodiments, the optical encoder includes an array of microlenses, each microlens covering at least two pixels of the image sensor. In some embodiments, the imaging system includes a first image capture device and a second capture device positioned in a stereoscopic arrangement with respect to the training biometric object, the first image capture device being configured to capture the first training image of each training image pair and the second image capture device being configured to capture the second training image of each training image pair.

In some embodiments, the neural network has a Siamese architecture including a pair of sub-branches with shared weights extending through the encoder and the decoder, the pair of sub-branches including a first sub-branch and a second sub-branch configured to receive the first training image and the second training image of each training image pair, respectively.

In some embodiments, the disparity encoder includes a hierarchy of encoding blocks configured to receive and perform a downsampling operation on each training image pair to generate the lower-resolution feature map pair and the lower-resolution sub-disparity map, the downsampling operation including generating a plurality of downsampled feature map pairs of increasingly coarser resolution by downsampling the training image pair successively through the hierarchy of encoding blocks, the plurality of downsampled feature map pairs including a plurality of intermediate downsampled feature map pairs and a final downsampled feature map pair, the final downsampled feature map pair being generated by a last one of the hierarchy of encoding blocks and forming the lower-resolution feature map pair, wherein the plurality of intermediate downsampled feature map pairs is used, via skip connections between the disparity encoder and the disparity decoder, in generating the plurality of intermediate upsampled feature map pairs.

In some embodiments, the reconstruction loss for each training image pair includes generating, from the training disparity map and one of the first and second training images, a reconstructed version of the other one of the first and second training images; and calculating the reconstruction loss based on an image similarity measure between the other one of the first and second training images and the reconstructed version thereof. In some embodiments, generating the reconstructed version of the other one of the first and second training images includes performing a warping operation using the training disparity map on the one of the first and second training images.

In some embodiments, computing the reconstruction loss for each training image pair is further based on the lower-resolution sub-disparity map and the plurality of intermediate upsampled sub-disparity maps. In some embodiments, generating the reconstructed version of the other one of the first and second upsampled feature maps includes performing a warping operation using the base sub-disparity map on the one of the first and second upsampled feature maps.

In accordance with another aspect, there is provided a method of training a neural network for face anti-spoofing. The neural network can include a first branch for estimating disparity (disparity estimation branch) and a second branch for detecting face anti-spoofing (classification branch). The disparity estimation branch can include a disparity encoder and a disparity decoder. The classification branch can include a plurality of layers, for example, convolutional layers, fully connected layers, pooling layers, and dropout layers.

The training method can include providing input training data for training the neural network. The input training data can include a plurality of input TDM image pairs ($I_+$, $I_-$). Each input TDM image pair ($I_+$, $I_-$) includes a first input TDM image $I_+$ and a second input TDM image $I_-$, which are separated from each other by an effective baseline distance, so that they provide different viewpoints from a scene including a training biometric object. In some embodiments, the first input TDM image $I_+$ can be referred to as a left image, and the second input TDM image $I_-$ can be referred to as a right image. The TDM image pair ($I_+$, $I_-$) can be captured by a TDM-based imaging system that includes a TDM and an image sensor. The TDM is configured to diffract light incident from a scene to generate diffracted light, the diffracted light encoding spatially modulated information about the angle of incidence of the received light. The image sensor is configured to detect the diffracted light generated by the TDM. The image sensor includes a first set of pixels configured to generate a first set of angle-dependent pixel responses and a second set of pixels configured to generate a second set of angle-dependent pixel responses, the first and second sets of angle-dependent pixel responses varying differently with the angle of incidence of the received light. The first set of angle-dependent pixel responses can be used to generate the first input TDM image $I_+$, and the second set of angle-dependent pixel responses can be used is to generate the second input TDM image $I_-$. The first input TDM image provides a first representation of the scene from a first viewpoint, and the second input TDM image provides a second representation of the scene from a second viewpoint different from the first viewpoint. The first and second viewpoints associated with the first and second input TDM images can be considered to be separated from each other by the effective baseline distance, referred to herein as a TDM baseline distance, from which a TDM disparity map can be obtained. In turn, depth information about the scene can be obtained from the TDM disparity map.

During training, the neural network takes an input TDM image pair ($I_+$, $I_-$) as input, and outputs a TDM disparity map d. The training method can also include encoding, by the disparity encoder, the input training data to generate encoded training data. For example, for each input TDM image pair ($I_+$, $I_-$) supplied to the disparity encoder, the disparity encoder may be configured to generate an encoded output that contains lower-dimensional features relevant to compute a disparity map. By using Siamese feature-extraction layers on $I_+$ and $I_-$, the outputs for $I_+$ and $I_-$ are expected to represent shared features that differ from each other by a slight shift along the disparity axis. The training method can further include decoding, by the disparity decoder, the encoded training data to generate decoded training data. For example, for each input TDM image pair ($I_+$, $I_-$), the disparity decoder may be configured to generate a TDM disparity map d corresponding to the input TDM image pair ($I_+$, $I_-$).

The neural network may be trained in an unsupervised manner, that is, without supervision from ground truth disparity, which are often difficult to acquire. In order to do so, the training method can include generating, for example, using a grid sampler method, a reconstructed TDM image pair ($I_-'$, $I_+'$) from the predicted TDM disparity map d and the input TDM image pair ($I_+$, $I_-$). Specifically, the disparity decoder may be configured to generate both (1) a reconstructed second TDM image $I_-'$ from the first input TDM image $I_+$ and the predicted TDM disparity map d and (2) a reconstructed first TDM image $I_+'$ from the second input TDM image $I_-$ and the predicted TDM disparity map −d. The training method can include comparing the reconstructed TDM image pair ($I_-'$, $I_+'$) to the input TDM image pair ($I_+$, $I_-$) to obtain a reconstruction error. The reconstruction error may be evaluated by a reconstruction loss function applied to both ($I_+$, $I_+'$) and ($I_-$, $I_-'$). In some embodiments, to ensure coherence in the disparity estimation, the neural network may be trained to produce two TDM disparity maps, $d_+$ and $d_-$, by successively feedforwarding ($I_+$, $I_-$), to obtain $d_+$, and ($I_-$, $I_+$), to obtain $d_-$, and into the neural network.

The training method can include using the encoded training data generated by the disparity encoder as input training data for the classification branch of the neural network. The encoded training data can be used as input training data for the classification branch because it has been found that while the disparity features from the encoded training data may have a lower resolution than the disparity features from the TDM disparity map generated by the disparity decoder, the disparity features from the encoded training data may contain enough information for performing biometric spoofing classification. The classification branch can be trained to produce, for each input TDM image pair ($I_+$, $I_-$), a binary output representing the probability distribution that the input TDM image pair ($I_+$, $I_-$) correspond to a genuine image or a spoofed image. In some embodiments, the classification branch is trained to predict the liveliness of a face. Classification training losses can be computed by comparing the output data from the classification branch to ground truth data (i.e., known information as to whether each input TDM image pair used for training is actually a genuine image or a spoofed image).

It is appreciated that by training the classification branch of the neural network with input training data obtained from the disparity encoder, rather than with the predicted TDM disparity map generated by the disparity decoder, one can obtain a significantly smaller and faster network for anti-spoofing detection during inference. This is because, in such a case, the disparity decoder would not be needed at inference. Rather, the method of detecting whether there is face spoofing in a test TDM image pair would involve passing the test TDM image pair through the disparity encoder to generate encoded data, and feeding the encoded data to the classification branch to predict whether the test TDM image pair represents a genuine face image or a spoofed face image. Stated otherwise, the disparity decoder may only be used for training and can be removed at deployment, resulting in faster inference speed.

In some embodiments, the disparity decoder can include a disparity upsampling module configured to impart more disparity information into the low-resolution encoded training data than conventional upsampling techniques. The provision of the disparity upsampling module can improve the spoofing detection performance of the classifier and the quality of the disparity maps reconstructed by the disparity decoder.

In some embodiments, the present techniques provide a method to train a convolutional neural network (CNN) to detect face and other biometric spoofing by imparting angular/depth information in the embeddings of the encoder of the CNN. In some embodiments, the training method can help discriminate between authentic and spoofed faces by utilizing image pairs obtained by a TDM-based imaging system. In some embodiments, the method can include two main steps: a disparity estimation step and a binary classification step. The network can take a TDM image pair as input and generate therefrom both a disparity map and a predicted class from the encoding. In some embodiments, the network can be trained with photometric reconstruction losses, which enables unsupervised training without using a ground truth disparity. The binary classification step can predict a probability that the input scene includes a real face. In some embodiments, in addition to these losses, a consistency check may be performed on the binary classification by minimizing the discrepancy between estimated probability distributions obtained from using both ($I_+$, $I_-$) and ($I_-$, $I_+$) as input, as well as a self-consistency check on $d_+$ and $d_-$. In some embodiments, the present techniques may be applied to any suitable CNN for various computer vision tasks, by adding an unsupervised auxiliary task to the training, based on the TDM-based pixel data. Since the disparity estimation task can be removed at inference time, its benefits can be obtained without or with negligible additional computational cost when deployed.

In accordance with another aspect, there is provided an apparatus including a neural network and a TDM-based imaging system such as described herein.

Other method and process steps may be performed prior, during or after the steps described herein. The order of one or more steps may also differ, and some of the steps may be omitted, repeated, and/or combined, as the case may be. It is also to be noted that some steps may be performed using various analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 4 also depicts curves of the sum $I_{sum}=I_++I_-$ and the difference $I_{diff}=I_+-I_-$ of the odd and even pixel responses as functions of θ.

DETAILED DESCRIPTION

Figure 1:
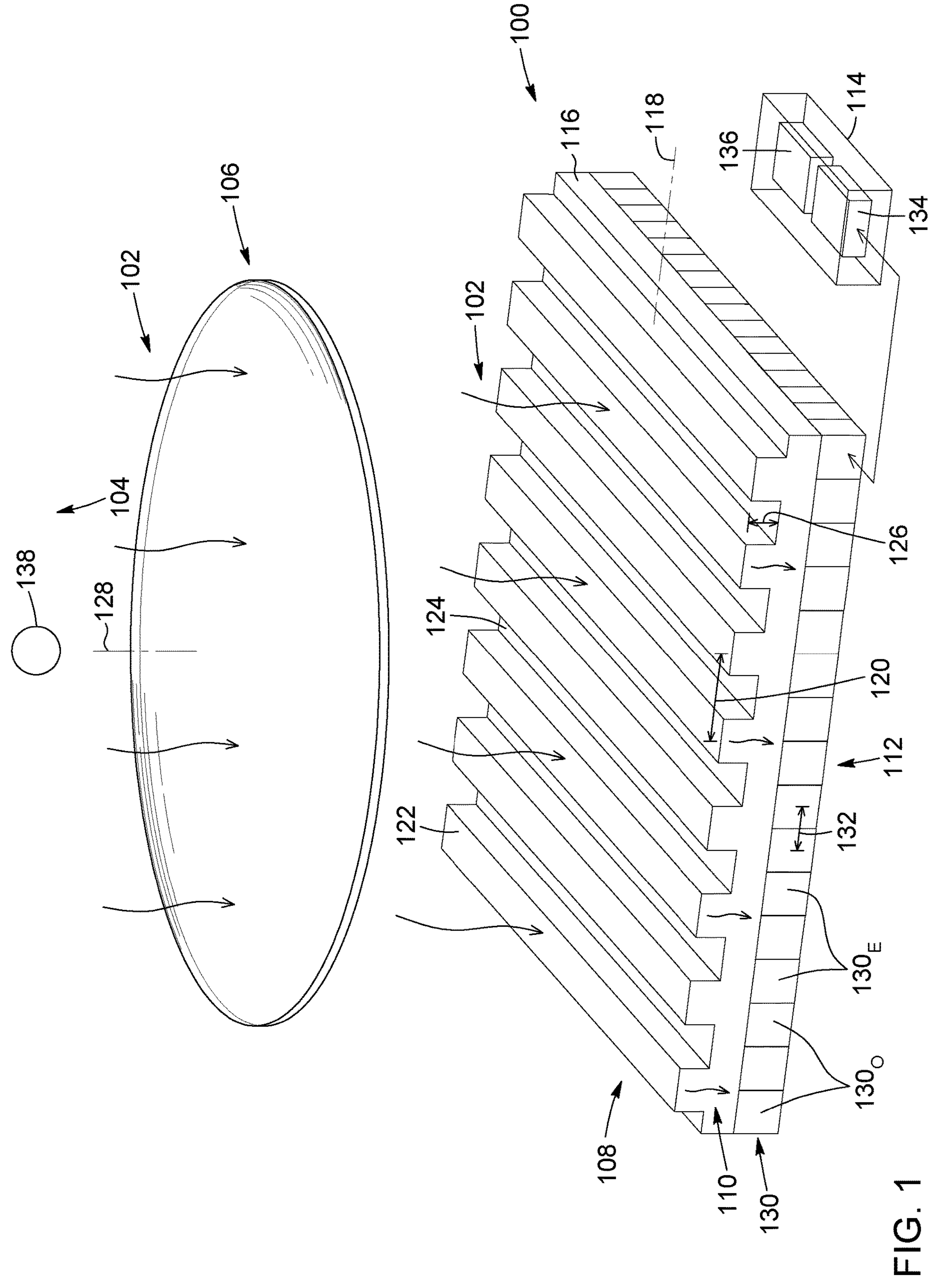
FIG. 1 is a schematic perspective view of an example of a TDM-based imaging system, which can be used in the neural-network-based biometric anti-spoofing techniques disclosed herein.

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Positional descriptors indicating the location and/or orientation of one element with respect to another element are used herein for ease and clarity of description. Unless otherwise indicated, these positional descriptors should be taken in the context of the figures and should not be considered limiting. In particular, positional descriptors are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application and/or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after completion of the second process.

The terms "light" and "optical", and variants and derivatives thereof, refer herein to radiation in any appropriate region of the electromagnetic spectrum. These terms are not limited to visible light, but may also include invisible regions of the electromagnetic spectrum including, without limitation, the terahertz (THz), infrared (IR), and ultraviolet (UV) regions. In some embodiments, the present techniques may be used with electromagnetic radiation having a center wavelength ranging from about 175 nanometers (nm) in the deep ultraviolet to about 300 micrometers (μm) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. However, these wavelength ranges are provided for illustrative purposes, and that the present techniques may operate beyond these ranges.

The present description generally relates to methods and systems using depth imaging for training and deploying artificial neural networks for face and other biometric anti-spoofing detection. The present techniques may be used in various biometric anti-spoofing applications. Non-limiting examples of possible fields of application include, to name a few, user authentication on mobile phones, gesture recognition, access control for offices and other facilities, automotive access control, 3D tracking, and 3D anomaly detection.

The term “artificial neural network”, or simply “neural network”, refers to any computing system or model that is capable of machine learning or pattern recognition. The neural network may include a plurality of artificial neurons or nodes, which are connected together via links. The links have adaptive weights representing connection strengths between neurons. The weights are iteratively updated during training of the network in such a manner as to decrease the error between the output of the network and the target output.

In some embodiments, the present techniques use depth imaging systems and methods that use a transmissive diffraction mask (TDM) in front of a standard 2D image sensor to provide the sensor with angle-sensitive pixels (ASPs). These pixels can measure not only the intensity of incoming light but also the angle at which light arrives at the image sensor. This angular information can be processed to provide depth information about a scene, which in turn can be used to improve face detection techniques. One reason is that typical types of face spoofing attacks, such as printed photos and video replays, involve flat objects, which can be distinguished from real faces using depth imaging.

Various aspects and implementations of the present techniques are described below with reference to the figures.

TDM-Based Imaging System Implementations

Figure 2:
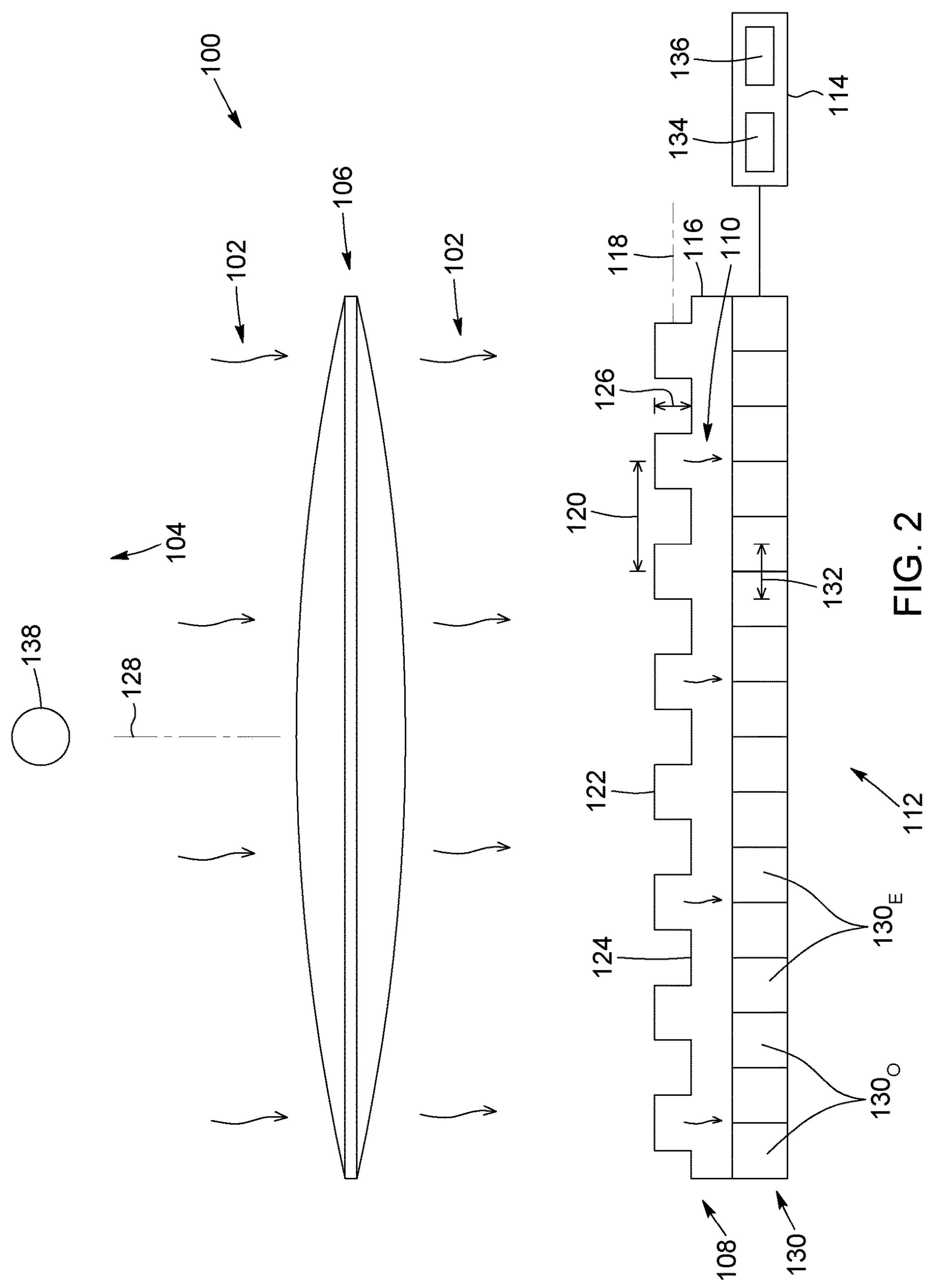
FIG. 2 is a schematic front elevation view of the TDM-based imaging system of FIG. 1.

Referring to FIGS. 1 and 2, there are provided schematic representations of an embodiment of a depth imaging system 100 for capturing image data representative of light 102 received from a scene 104 within a field of view of the imaging system 100. The captured image data include depth information about the scene 104. The scene 104 can include a biometric object 138 to be tested for spoofing. In the present description, the term “depth imaging system” may be shortened to “imaging system” for simplicity. The imaging system 100 may be used to implement the techniques disclosed herein for training and deploying neural networks for biometric anti-spoofing. The term “scene” refers herein to any region, space, surface, environment, object, target, or information of interest which may be imaged according to the present techniques.

The imaging system 100 illustrated in FIGS. 1 and 2 generally includes an imaging lens 106 configured to receive and transmit the light 102 from the scene 104, an angle-sensitive optical encoder embodied by a transmissive diffraction mask (TDM) 108 configured to diffract the light 102 received from imaging lens 106 to generate diffracted light 110 having encoded therein information about the angle of incidence of the received light 102; an image sensor 112 configured to detect the diffracted light 110 and convert the detected diffracted light 110 into image data; and a computer device 114 configured to process the image data generated by the image sensor 112 to determine angle-of-incidence information about the received light 102, from which depth information about the scene 104 may be determined. The structure, configuration, and operation of these and other possible components of the imaging system 100 are described in greater detail below. It is appreciated that FIGS. 1 and 2 are simplified schematic representations that illustrate a number of components of the imaging system 100, such that additional features and components that may be useful or necessary for the practical operation of the imaging system 100 may not be specifically depicted.

The provision of an angle-sensitive optical encoder such as a TDM 108 between the imaging lens 106 and the image sensor 112 can impart the depth imaging system 100 with 3D imaging capabilities, including depth sensing capabilities. This is because the TDM 108 is configured to diffract the light 102 received thereon into diffracted light 110, whose intensity pattern is spatially modulated in accordance with the angle-of-incidence distribution of the received light 102. The underlying image sensor 112 is configured to sample, on a per-pixel basis, the intensity pattern of the diffracted light 110 in the near-field to provide image data conveying information indicative of the angle of incidence of the received light 102. The image data may be used or processed in a variety of ways to provide multiple functions including, but not limited to, 3D depth map extraction, 3D surface reconstruction, image refocusing, and the like. Depending on the application, the image data may be acquired as one or more still images or as a video stream.

The structure, configuration, and operation of imaging devices that use transmissive diffraction grating structures in front of 2D image sensors to provide 3D imaging capabilities are described in the following co-assigned international patent applications PCT/CA2017/050686 (published as WO 2017/210781), PCT/CA2018/051554 (published as WO 2019/109182), PCT/CA2020/050760 (published as WO 2020/243828), PCT/CA2021/051635 (published as WO 2022/104467) and PCT/CA2022/050018 (published as WO 2022/150903) as well as in the following master’s thesis: Kunnath, Neeth, *Depth from Defocus Using Angle Sensitive Pixels Based on a Transmissive Diffraction Mask* (Master’s thesis, McGill University Libraries, 2018). The contents of these six documents are incorporated herein by reference in their entirety. It is appreciated that the theory and applications of such diffraction-based 3D imaging devices are generally known in the art, and need not be described in detail herein other than to facilitate an understanding of the present techniques.

In the embodiment illustrated in FIGS. 1 and 2, the TDM 108 includes a diffraction grating 116 having a grating axis 118 and a grating profile, the grating profile having a grating period 120 along the grating axis 118.

The term “diffraction grating”, or simply “grating”, refers herein to a structure or material having a spatially modulated optical property and which is configured to spatially modulate the amplitude and/or the phase of an optical wavefront incident thereon. The spatially modulated optical property, for example, a refractive index modulation pattern, defines the grating profile. In some embodiments a diffraction grating may include a periodic arrangement of diffracting elements, such as alternating ridges and grooves, whose spatial period, the grating period, is substantially equal to or longer than the center wavelength of the optical wavefront incident thereon. Diffraction gratings may also be classified as "amplitude gratings" or "phase gratings", depending on the nature of the diffracting elements. In amplitude gratings, the perturbations to the incident wavefront caused by the grating are the result of a direct amplitude modulation, while in phase gratings, these perturbations are the result of a modulation of the relative group velocity of light caused by a spatial variation of the refractive index of the grating structure or material. In several embodiments disclosed herein, the diffraction gratings are phase gratings, which generally absorb less light than amplitude gratings, although amplitude gratings may be used in other embodiments. In general, a diffraction grating is spectrally dispersive, if only slightly, so that different wavelengths of an incident optical wavefront may be diffracted differently. However, diffraction gratings exhibiting a substantially achromatic response over a certain operating spectral range can be used in some embodiments.

The diffraction grating 116 in FIGS. 1 and 2 is a transmission phase grating, specifically a binary phase grating whose grating profile is a two-level, square-wave function. The diffraction grating 116 has a grating profile along the grating axis 118. The grating profile includes a series of ridges 122 periodically spaced apart at the grating period 120, interleaved with a series of grooves 124 also periodically spaced apart at the grating period 120. In such a case, the grating period 120 corresponds to the sum of the width, along the grating axis 118, of one ridge 122 and one adjacent groove 124. The diffraction grating 116 may also be characterized by a duty cycle, defined as the ratio of the ridge width to the grating period 120, and by a step height 126, defined as the difference in level between the ridges 122 and the grooves 124. The step height 126 may provide a predetermined optical path difference between the ridges 122 and the grooves 124. In some embodiments, the grating period 120 may range between about 0.1 μm and about 20 μm, and the step height 126 may range between about 0.1 μm and about 1 μm, although values outside these ranges can be used in other embodiments. In the illustrated embodiment, the diffraction grating 116 has a duty cycle equal to 50%, but duty cycle values different from 50% may be used in other embodiments. Depending on the application, the grooves 124 may be empty or filled with a material having a refractive index different from that of the ridge material. In the illustrated embodiment, the TDM 108 includes a single diffraction grating 116. However, TDMs including more than one diffraction grating may be used in other embodiments.

The imaging lens 106 is disposed between the scene 104 and the TDM 108. The imaging lens 106 is configured to receive the light 102 from the scene 104 and focus or otherwise direct the received light 102 onto the TDM 108. The imaging lens 106 can define an optical axis 128 of the imaging system 100. Depending on the application, the imaging lens 106 may include a single lens element or a plurality of lens elements. In some embodiments, the imaging lens 106 may be a focus-tunable lens assembly. In such a case, the imaging lens 106 may be operated to provide autofocus, zoom, and/or other optical functions.

The image sensor 112 includes an array of photosensitive pixels 130. The pixels 130 are configured to detect electromagnetic radiation incident thereon and to convert the detected radiation into electrical signals that can be processed to generate image data conveying information about the scene 104. In the illustrated embodiment, each pixel 130 is configured to detect a corresponding portion of the diffracted light 110 produced by the TDM 108 and to generate therefrom a respective pixel response. The pixels 130 may each include a light-sensitive region and associated pixel circuitry for processing signals and communicating with other electronics. In general, each pixel 130 may be individually addressed and read out. In the illustrated embodiment, the pixels 130 are arranged in an array of rows and columns defined by two orthogonal pixel axes, although other arrangements may be used in other embodiments. In some embodiments, the image sensor 112 may include hundreds of thousands or millions of pixels 130, for example, from about 1080×1920 to about 6000×8000 pixels. However, many other sensor configurations with different pixel arrangements, aspect ratios, and fewer or more pixels are contemplated. Depending on the application, the pixels 130 of the image sensor 112 may or may not be all identical. In some embodiments, the image sensor 112 may be a CMOS or a CCD array imager, although other types of photodetector arrays (e.g., charge injection devices or photodiode arrays) may also be used. The image sensor 112 may operate according to a rolling or a global shutter readout scheme, and may be part of a stacked, backside, or frontside illumination sensor architecture. Furthermore, the image sensor 112 may be implemented using various image sensor architectures and pixel array configurations, and may include various additional components. Non-limiting examples of such additional components can include, to name a few, microlenses, color filters, color filter isolation structures, light guides, pixel circuitry, and the like. The structure, configuration, and operation of such possible additional components are generally known in the art and need not be described in detail herein.

In some embodiments, the imaging system 100 may be implemented by adding or coupling the TDM 108 on top of an existing image sensor 112. For example, the existing image sensor 112 may be a conventional CMOS or CCD imager. In other embodiments, the imaging system 100 may be implemented and integrally packaged as a separate, dedicated, and/or custom-designed device incorporating therein all or most of its hardware components, including the imaging lens 106, the TDM 108, and the image sensor 112. In the embodiment depicted in FIGS. 1 and 2, the TDM 108 extends over the entire pixel array such that all of the pixels 130 detect diffracted light 110 having passed through the TDM 108. However, in other embodiments, the TDM 108 may cover only a portion of the pixel array such that only a subset of the pixels 130 detects diffracted light 110.

The array of pixels 130 may be characterized by a pixel pitch 132. The term "pixel pitch" refers herein to the separation (e.g., the center-to-center distance) between nearest-neighbor pixels. In some embodiments, the pixel pitch 132 may range between about 0.7 μm and about 10 μm, although other pixel pitch values may be used in other embodiments. The pixel pitch 132 is defined along the grating axis 118. Depending on the application, the pixel pitch 132 may be less than, equal to, or greater than the grating period 120. For example, in the illustrated embodiment, the grating period 120 is twice as large as the pixel pitch 132. However, other grating-period-to-pixel-pitch ratios, R, may be used in other embodiments. Non-limiting examples of possible ratio values include, to name a few, $R \geq 2$; $R=(n+1)$, where n is a positive integer; $R=2n$, where n is a positive integer; $R=1$; $R=2/(2n+1)$, where n is a positive integer, for example, n=1 or 2; and R=n/N, where n and N are positive integers larger than two and N>n, for example, n=3 and N=4.

In the embodiment illustrated in FIGS. 1 and 2, the diffraction grating 116 is disposed over the image sensor 112 such that the center of each ridge 122 is laterally aligned with the midpoint between adjacent pixels 130, and likewise for the center of each groove 124. Different configurations are possible in other embodiments. For example, in some embodiments, the degree of alignment between the TDM 108 and the image sensor 112 may be adjusted in accordance with a chief ray angle (CRA) function or characteristic associated with the imaging lens 106. In such a case, the alignment between the TDM 108 and the image sensor 112 may change as a function of position within the pixel array, for example, as one goes from the center to the edge of the array. This means, for example, that depending on its position within the image sensor 112, a given pixel 130 may be aligned with a center of a ridge 122, a center of a groove 124, a transition between a ridge 122 and a groove 124, or some intermediate position of the corresponding overlying diffraction grating 116.

Referring still to FIGS. 1 and 2, the computer device 114 is operatively coupled to the image sensor 112 to receive therefrom image data about the scene 104. The image data may include a set of pixel responses. The computer device 114 may be configured to determine, from the set of pixel responses, angle-of-incidence information conveying the angle-of-incidence distribution of the received light 102. The computer device 114 may be configured to determine depth information about the scene 104, for example, a depth map, based on the angle-of-incidence information. The computer device 114 may be provided within one or more general purpose computers and/or within any other suitable devices, implemented in hardware, software, firmware, or any combination thereof, and connected to the components of the imaging system 100 via appropriate wired and/or wireless communication links and interfaces. Depending on the application, the computer device 114 may be fully or partly integrated with, or physically from, the image sensor 112. In some embodiments, the computer device 114 may include a distributed and/or cloud computing network. The computer device 114 can include a processor 134 and a memory 136.

The processor 134 can implement operating systems, and may be able to execute computer programs, also known as commands, instructions, functions, processes, software codes, executables, applications, and the like. While the processor 134 is depicted in FIGS. 1 and 2 as a single entity for illustrative purposes, the term "processor" should not be construed as being limited to a single processing entity, and accordingly, any known processor architecture may be used. In some embodiments, the processor 134 may include a plurality of processing entities. Such processing entities may be physically located within the same device, or the processor 134 can represent the processing functionalities of a plurality of devices operating in coordination. For example, the processor 134 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 136, which may also be referred to as a "computer readable storage medium" or "a computer readable memory" is configured to store computer programs and other data to be retrieved by the processor 134. The terms "computer readable storage medium" and "computer readable memory" refer herein to a non-transitory and tangible computer product that can store and communicate executable instructions for the implementation of various steps of the techniques disclosed herein. The memory 136 may be any computer data storage device or assembly of such devices, including a random-access memory (RAM); a dynamic RAM; a read-only memory (ROM); a magnetic storage device, such as a hard disk drive, a solid state drive, a floppy disk, or a magnetic tape; an optical storage device, such as a compact disc (CD or CDROM), a digital video disc (DVD), or a Blu-Ray™ disc; a flash drive memory; and/or any other non-transitory memory technologies. The memory 136 may be associated with, coupled to, or included in the processor 134, and the processor 134 may be configured to execute instructions contained in a computer program stored in the memory 136 and relating to various functions and operations associated with the processor 134. While the memory 136 is depicted in FIGS. 1 and 2 as a single entity for illustrative purposes, the term "memory" should not be construed as being limited to a single memory unit, and accordingly, any known memory architecture may be used. In some embodiments, the processor 136 may include a plurality of memory units. Such memory units may be physically located within the same device, or the memory 136 can represent the functionalities of a plurality of devices operating in coordination.

Figures 3A, 3B, 3C:
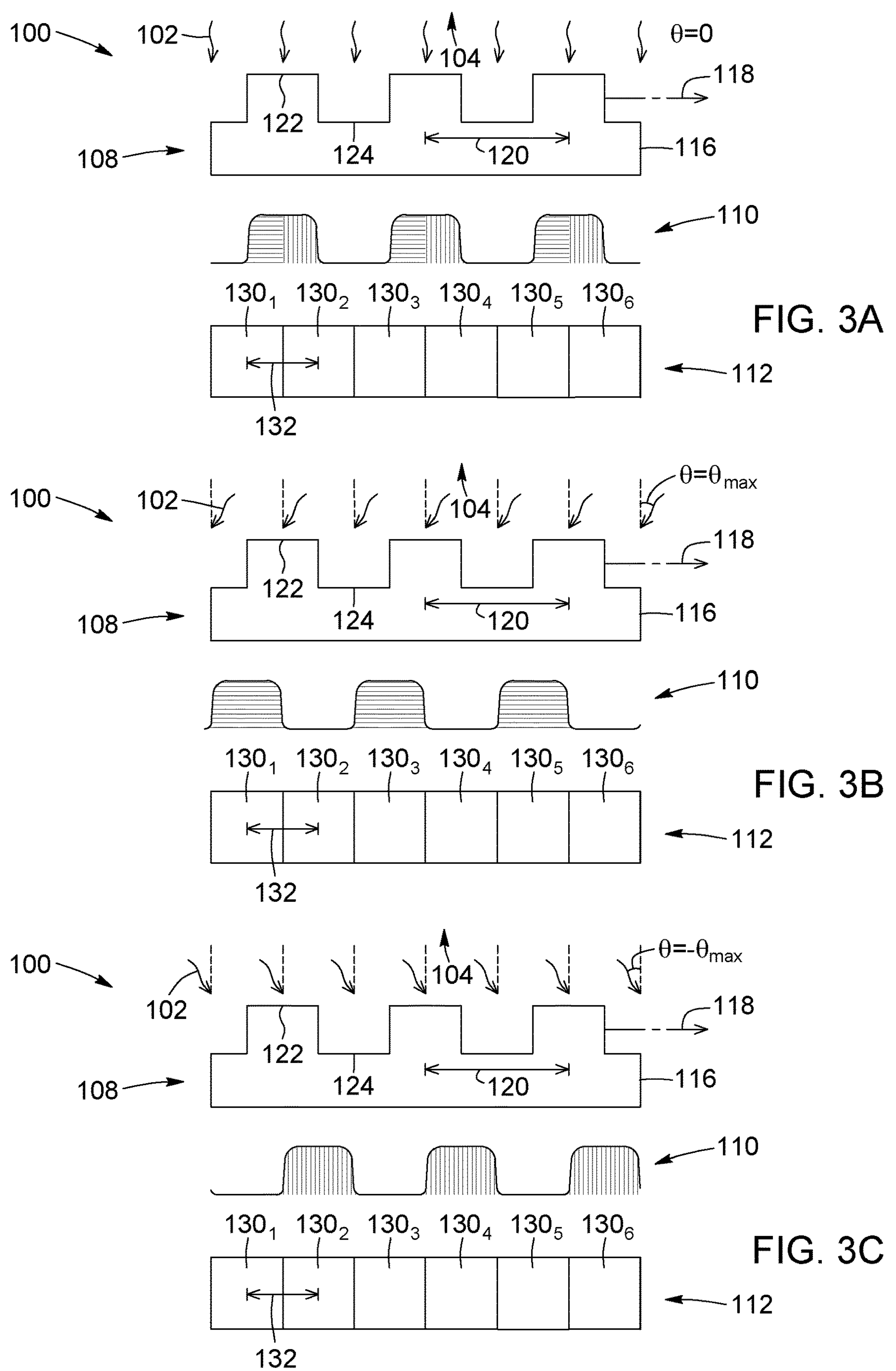
FIGS. 3A to 3C are schematic representations of another example of a TDM-based imaging system receiving light with three different angles of incidence θ: normal incidence, $\theta=0$ (FIG. 3A); oblique incidence, $\theta=\theta_{max}>0$ (FIG. 3B); and oblique incidence, $\theta=-\theta_{max}<0$ (FIG. 3C).

Referring to FIGS. 3A to 3C, the operation of TDM-based imaging systems and how they can be used to provide depth sensing capabilities will be described in greater detail. FIGS. 3A to 3C are schematic representations of an example of a depth imaging system 100 receiving light 102 with three different angles of incidence θ from an observable scene 104 (FIG. 3A: normal incidence, θ=0; FIG. 3B: oblique incidence, $\theta=\theta_{max}>0$; and FIG. 3C: oblique incidence, $\theta=-\theta_{max}<0$). The imaging system 100 includes a TDM 108 and an image sensor 112 disposed under the TDM 108. The TDM 108 includes a binary phase diffraction grating 116 having a grating axis 118 and a grating profile having a grating period 120 and including alternating ridges 122 and grooves 124 with a duty cycle of 50%. The image sensor 112 includes a set of pixels 130$_1$-130$_6$. The diffraction grating 116 is disposed over the pixels 130$_1$-130$_6$ such that the center of each ridge 122 is aligned with the midpoint between adjacent ones of the pixels 130$_1$-130$_6$, and likewise for the center of each groove 124. The grating period 120 is twice as large as the pixel pitch 132.

In operation of the imaging system 100, the diffraction grating 116 receives light 102 from the scene 104 on its input side, and diffracts the received light 102 to generate, on its output side, diffracted light 110 that travels toward the image sensor 112 for detection by the pixels 130$_1$-130$_6$. The diffracted light 110 has an intensity pattern that is spatially modulated based, inter alia, on the geometrical and optical properties of the diffraction grating 116, the angle of incidence θ of the received light 102, and the position of the observation plane (e.g., the image sensor 112, or an intermediate optical component, such as a microlens array, configured to relay the diffracted light 110 onto the pixels $130_1$-$130_6$). In the example illustrated in FIGS. 3A to 3C, the observation plane corresponds to the light-receiving surface defined by the pixels 130$_1$-130$_6$ of the image sensor 112. The TDM 108 and the image sensor 112 are disposed relative to each other such that the light-receiving surface of the image sensor 112 is positioned in the near-field diffraction region of the diffraction grating 116. For example, in order to detect the diffracted light 110 in the near-field, the separation distance between the grating profile of the diffraction grating 116, where the diffracted light 110 is formed, and the light-receiving surface of the image sensor 112, where the diffracted light 110 is detected, may range between about 0.2 μm and about 20 μm, such as between about 0.5 μm and about 8 μm if the center wavelength of the received light 102 is in the visible range.

The Talbot effect is a near-field diffraction effect in which plane waves incident on a periodic structure, such as a diffraction grating, produce self-images of the periodic structure at regular distances behind the periodic structure. The self-images can be referred to as Talbot images. The main distance at which self-images of the periodic structure are observed due to interference is called the Talbot length $z_T$. In the case of a diffraction grating having a grating period g, the Talbot length $z_T$ may be expressed as follows: $z_T=\lambda/[1-(1-\lambda^2/g^2)^{1/2}]$, where λ is the wavelength of the light incident on the grating. This expression simplifies to $z_T=2g^2/\lambda$ when g is sufficiently large compared to λ. Other self-images are observed at integer multiples of the half-Talbot length, that is, at $nz_T/2$. These additional self-images are either in-phase (if n is even) and out-of-phase (if n is odd) by half of the grating period with respect to the self-image observed at $z_T$. Further sub-images with smaller periods can also be observed at smaller fractional values of the Talbot length. These self-images are observed in the case of amplitude gratings.

In the case of phase gratings, such as the one depicted in FIGS. 3A to 3C, it is the phase of the grating that is self-imaged at integer multiples of the half-Talbot length, which cannot be observed using intensity-sensitive photodetectors, such as photodiodes. As such, a phase grating, unlike an amplitude grating, produces a diffracted wavefront of substantially constant light intensity in an observation plane located at integer multiples of the half-Talbot length. However, phase gratings may also be used to generate near-field intensity patterns similar to Talbot self-images at intermediate observation planes that are shifted from the planes located at integer multiples of the half-Talbot length. For example, such intermediate observation planes may be located at $z_T/4$ and $3z_T/4$. These intensity patterns produced by phase gratings, which are sometimes referred to as Lohmann images, can be detected with intensity-sensitive photodetectors.

In the example illustrated in FIGS. 3A to 3C, the diffraction grating 116 and the image sensor 112 are positioned relative to each other so as to detect these Talbot-like, near-field intensity patterns formed at observation planes corresponding to non-integer multiples of the half-Talbot length (i.e. Lohman images), for example, at $z_T/4$ or $3z_T/4$. In such a case, the diffraction grating 116 is configured to generate, in the observation plane, diffracted light 110 having an intensity pattern that is spatially modulated according to the grating period 120. As depicted in FIGS. 3A to 3C, the intensity pattern of the diffracted light 110 has a spatial period that matches or relates to the grating period 120 and a shape that matches or relates to the grating profile. In FIGS. 3A to 3C, the spatial period of the intensity pattern of the diffracted light 110 is substantially equal to the grating period 120. However, in other embodiments, the spatial period of the intensity pattern of the diffracted light 110 may be a rational fraction of the grating period 120, such as half of the grating period 120 in the case of doubled Lohmann images. Each of the pixels 130$_1$-130$_6$ of the image sensor 112 is configured to sample a respective portion of the intensity pattern of the diffracted light 110 and to generate therefrom a corresponding intensity-based pixel response. In FIGS. 3A to 3C, the horizontally hatched portions of the intensity pattern of the diffracted light 110 are sampled by the odd pixels 130$_1$, 130$_3$, 130$_5$, while the vertically hatched portions are sampled by the even pixels 130$_2$, 130$_4$, 130$_6$.

Another property of Lohmann self-images is that they shift laterally along the grating axis 118 upon varying the angle of incidence θ of the received light 102, while substantially retaining their period and shape. This can be seen from a comparison between the intensity pattern of the diffracted light 110 illustrated in FIGS. 3A to 3C. The diffraction grating 116 is configured to impart an asymmetric angle-dependent spatial modulation to the intensity pattern of the diffracted light 110, which is sampled by the pixels 130$_1$-130$_6$. By controlling the lateral alignment between the diffraction grating 116 and the image sensor 112 and the relationship between the grating period 120 and the pixel pitch 132, the intensities measured by the individual pixels 130$_1$-130$_6$ for a given intensity of the received light 102 will vary as a function of the angle of incidence θ due to the lateral shifts experienced by the diffracted light 110. For example, in FIGS. 3A to 3C, the intensities measured by the odd pixels 130$_1$, 130$_3$, 130$_5$ are respectively equal to (FIG. 3A), greater than (FIG. 3B), and less than (FIG. 3C) the intensities measured by the even pixels 130$_2$, 130$_4$, 130$_6$. The angle-dependent information encoded by the diffraction grating 116 into the intensity pattern of the diffracted light 110 is recorded by the image sensor 112 as a set of individual intensity-based pixel responses, which can be processed to provide depth information about the scene 104.

Figure 4:
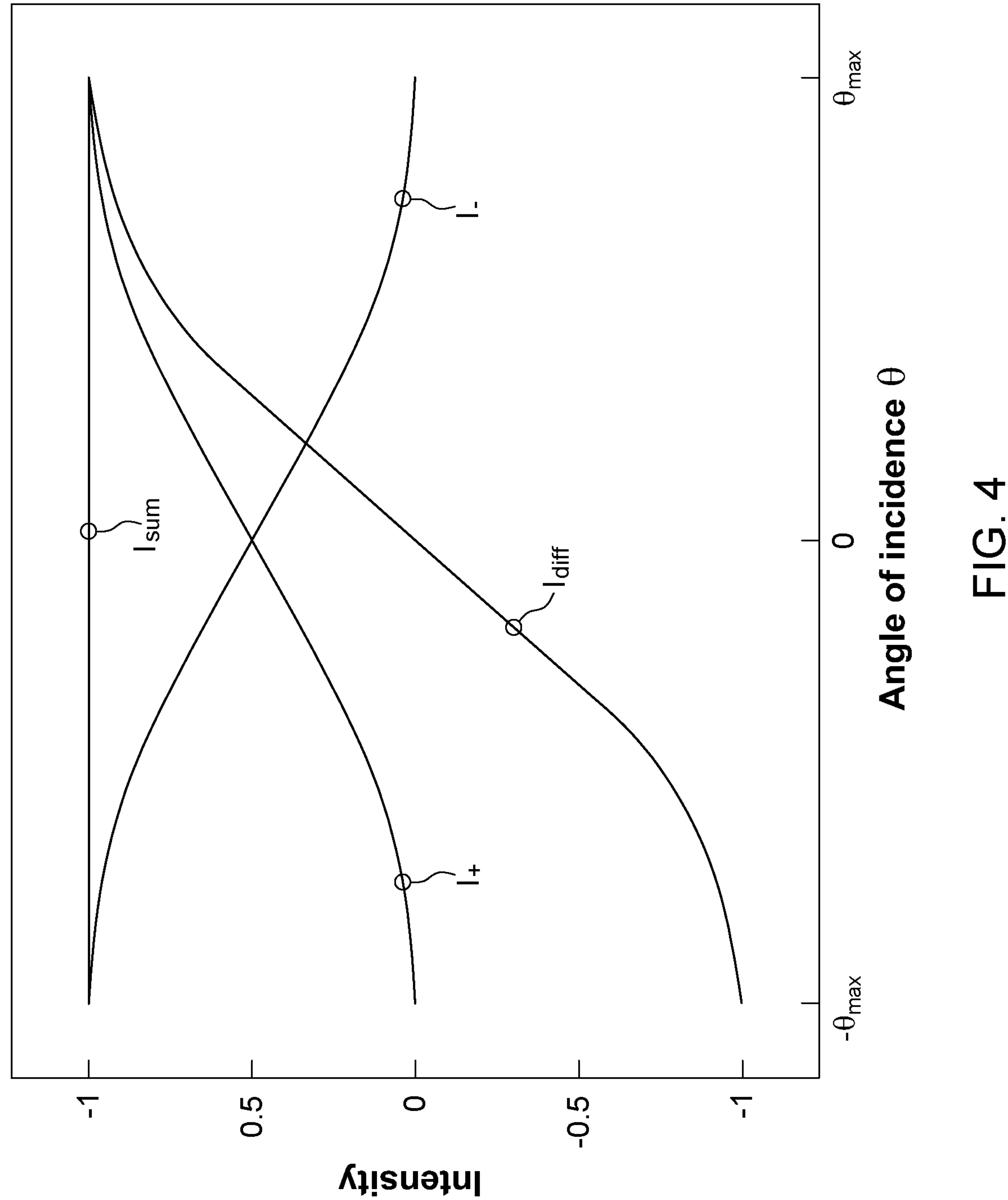
FIG. 4 is a graph depicting curves of the individual pixel responses of the odd pixels ($I_+$) and the even pixels ($I_-$) of the TDM-based depth imaging system of FIGS. 3A to 3C, plotted as functions of the angle of incidence θ, for a given intensity of incident light.

Referring to FIG. 4, there are depicted curves of the individual pixel responses of the odd pixels 130$_1$, 130$_3$, 130$_5$ ($I_+$) and the even pixels 130$_2$, 130$_4$, 130$_6$ ($I_-$) of FIGS. 3A to 3C, plotted as functions of the angle of incidence θ, for a given intensity of incident light. FIG. 4 assumes that the intensity of the incident light is equal to one and that there is a modulation depth of substantially 100% between $\theta=\pm\theta_{max}$, where the maxima of the diffracted intensity pattern are centered on either the odd pixels 130$_1$, 130$_3$, 130$_5$ or the even pixels 130$_2$, 130$_4$, 130$_6$ (peak modulated level), and θ=0, where the maxima of the diffracted intensity pattern are centered on the transitions between the odd pixels 130$_1$, 130$_3$, 130$_5$ or the even pixels 130$_2$, 130$_4$, 130$_6$ (unmodulated level). It is seen that $I_+$ and $I_-$ have complementary asymmetrical angular responses, where $I_+$ and $I_-$ are mirror functions of each other with respect to the unmodulated level axis (dashed line in FIG. 4) and where $I_+$ and $I_-$ respectively increases and decreases as θ increases. FIG. 4 also depicts curves of the sum $I_{sum}=I_++I_-$ and the difference $I_{diff}=I_+-I_-$ of the odd and even pixel responses as functions of θ.

It is appreciated that since the intensities $I_+$ and $I_-$ vary in a complementary way as a function of θ, their sum $I_{sum}$ remains, in principle, independent of θ. In practice, $I_{sum}$ can be controlled to remain largely independent of θ, or at least symmetrical with respect to θ (i.e., so that $I_{sum}(\theta)=I_{sum}(-\theta)$. The summed pixel response, $I_{sum}$, is similar to the signal that would be obtained by the pixels 130$_1$-130$_6$ in the absence of the diffraction grating 116. In particular, $I_{sum}$ can provide 2D intensity image information, with no or little angle-dependent information encoded therein. The differential pixel response, $I_{diff}$, varies asymmetrically as a function of θ and represents a measurement of the angle-of-incidence information encoded into the diffracted light 110 by the diffraction grating 116. The pixel responses $I_+$, $I_-$, $I_{sum}$, and $I_{diff}$ may be expressed mathematically as follows:

$$I_\pm(\theta) = \frac{I_0}{2}[1 \pm m\sin(\beta\theta)], \tag{1}$$

$$I_{sum} = I_0, \tag{2}$$

$$I_{diff}(\theta) = I_0 m\sin(\beta\theta), \tag{3}$$

where $I_0$ is the intensity of the incident light, m is a modulation depth parameter, and β is an angular sensitivity parameter. For example, in FIG. 4, $I_0=1$, m=1, and $\beta=\pi/(2\theta_{max})$. It is noted that the expressions for the intensity-based pixel responses $I_+$ and $I_-$ in Equation (1) are not exact relationships. However, they can provide convenient analytical expressions that are adequately representative of how $I_+$ and $I_-$ may vary as a function of the angle of incidence.

Equation (2) implies that each summed pixel response $I_{sum}$ is obtained by summing one odd pixel response $I_+$ and one even pixel response $I_-$, and Equation (3) implies that each differential pixel response $I_{diff}$ is obtained by subtracting one even pixel response $I_-$ from one odd pixel response $I_+$. Such an approach may be viewed as a 2×1 binning mode. However, other approaches can be used to determine summed and differential pixel responses $I_{sum}$ and $I_{diff}$, for example, a 2×2 binning mode (e.g., $I_{sum}=I_{1+}+I_{1-}+I_{2+}+I_{2-}$ and $I_{diff}=I_{1+}-I_{1-}+I_{2+}-I_{2-}$, where $I_{1\pm}$ is a first pair of odd and even pixel responses and $I_{2\pm}$ is an adjacent second pair of odd and even pixel responses), or a convolution mode (e.g., using a kernel such that $I_{sum}$ and $I_{diff}$ have the same pixel resolution as $I_+$ and $I_-$). In this regard, the term "differential" is used herein to denote not only a subtraction between two pixel responses, but also a more involved differential operation from which a difference between two or more pixel responses is obtained. Furthermore, although the example of FIGS. 3A to 3C defines two groups of pixels 130 with different pixel responses as a function of the angle of incidence (i.e., the odd pixels $\mathbf{130}_1$, $\mathbf{130}_3$, $\mathbf{130}_5$ and the even pixels $\mathbf{130}_2$, $\mathbf{130}_4$, $\mathbf{130}_6$), other embodiments may define groups composed of more than two pixels with different angular responses.

The summed and differential pixel responses, $I_{sum}$ and $I_{diff}$, may be processed to provide depth information about the scene 104. In some embodiments, the summed and differential pixel responses $I_{sum}$ and $I_{diff}$ from all the odd-even pixel pairs or groups may be used to provide a TDM disparity map. The TDM disparity map is made of a set of TDM disparities, $d_{TDM}$, one for each odd-even pixel pair or group (or TDM pixel pair or group). The TDM disparity map is representative of the difference between the viewpoint of the scene 104 provided by the odd pixels $\mathbf{130}_1$, $\mathbf{130}_3$, $\mathbf{130}_5$ and the viewpoint of the scene 104 provided by the even pixels $\mathbf{130}_2$, $\mathbf{130}_4$, $\mathbf{130}_6$. Stated otherwise, the odd pixel responses $I_+$ and the even pixel responses $I_-$ can provide two slightly different views of the scene 104, separated by an effective TDM baseline distance. The TDM baseline distance can depend on, inter alia, the modulation depth parameter m, the angular sensitivity parameter β, and the numerical aperture of the imaging lens 106 (e.g., the lens diameter). It is appreciated that the TDM baseline distance is generally smaller than stereoscopic baseline distances of conventional stereoscopic imaging systems (e.g., including a pair of imaging devices or cameras). The TDM disparity map can be processed to generate a depth map of the scene 104.

Returning to FIGS. 1 and 2, the pixels 130 of the image sensor 112 can be said to include odd pixels $\mathbf{130}_O$ and even pixels $\mathbf{130}_E$, which are respectively designated by the letters "0" and "E" in FIGS. 1 and 2. In some applications, the odd pixels $\mathbf{130}_O$ can be referred to as "left pixels", while the even pixels $\mathbf{130}_E$ can be referred to as "right pixels". The odd pixels $\mathbf{130}_O$ and the even pixels $\mathbf{130}_E$ are configured to sample complementary portions of the diffracted light 110 over a full period thereof. The pixel responses $I_+$ of the odd pixels $\mathbf{130}_O$ and the pixel responses $I_-$ of the even pixels $\mathbf{130}_E$ may be described by Equation (1). Using Equations (2) and (3), the odd and even pixel responses $I_+$ and $I_-$ can be used to compute a set of summed pixel responses $I_{sum}$ and a set of differential pixel responses $I_{diff}$, respectively. The computer device 114 may be configured to determine depth information about the scene 104 from the set of summed pixel responses $I_{sum}$ and the set of differential pixel responses $I_{diff}$, for example, by computing a set of TDM disparities and obtaining therefrom a TDM disparity map. As described in greater detail below, in the present techniques, the TDM disparity map can be obtained from the odd and even pixel responses $I_+$ and $I_-$ using a different method, namely a neural-network-based approach that need not involve the computation of $I_{sum}$ and $I_{diff}$.

Figure 5:
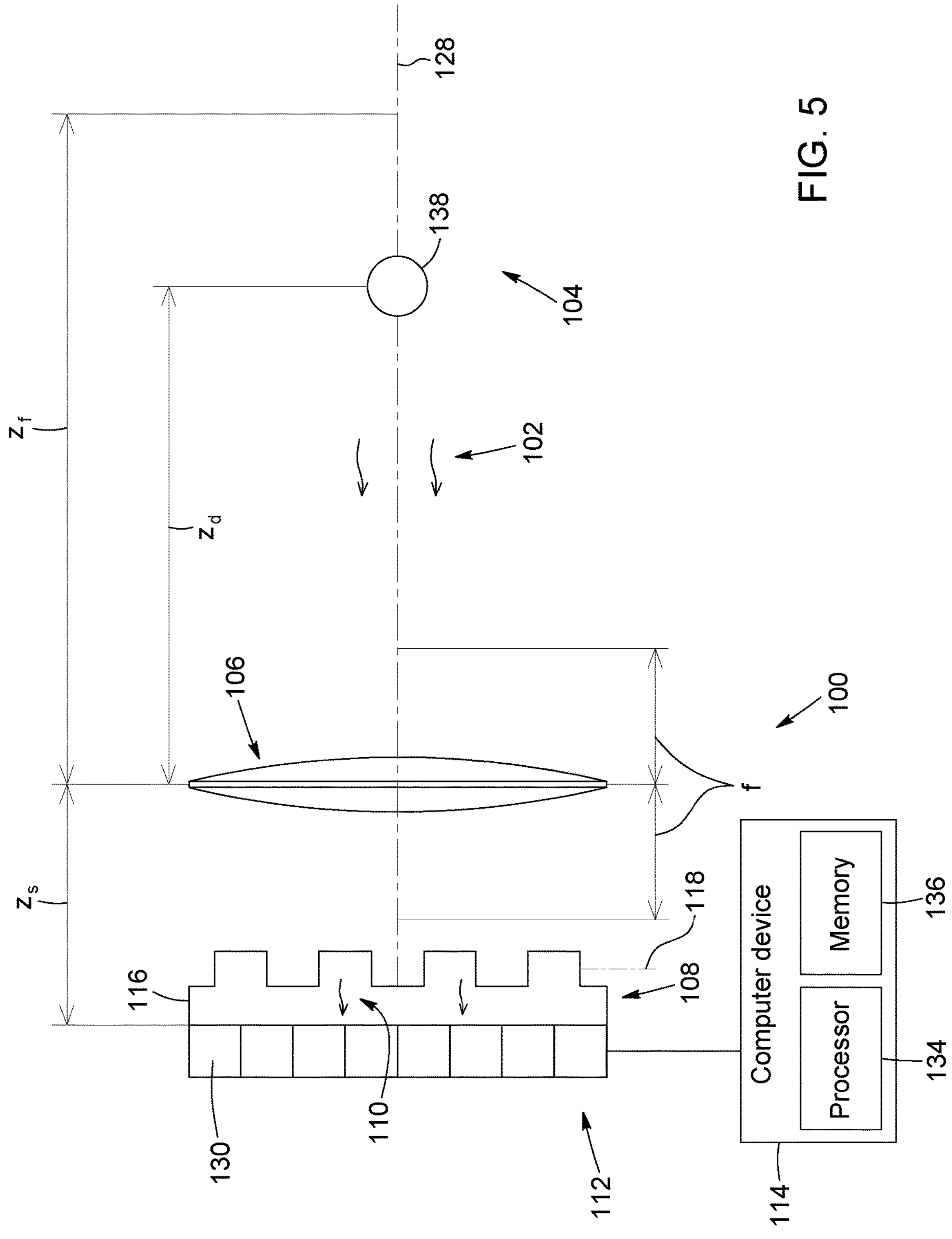
FIG. 5 is a schematic side view of another example of a TDM-based imaging system, which can be used in the neural-network-based biometric anti-spoofing techniques disclosed herein.

The TDM disparity map conveys relative depth information about the scene 104, but it generally does not directly provide absolute depth information. Referring to FIG. 5, there is provided a schematic representation of an embodiment of a TDM-based imaging system 100 for capturing image data representative of light 102 received from a scene 104. The imaging system 100 generally includes an imaging lens 106, a TDM 108, an image sensor 112, a computer device 114. The structure, configuration, and operation of these components may be similar to those described above with respect to FIGS. 1 and 2.

In some embodiments, the absolute depth, $z_d$, of an object 138 in a scene 104 can be related to the TDM disparity d as follows:

$$d_{TDM} = S_{TDM}\left(\frac{1}{z_d} - \frac{1}{z_f}\right), \tag{4}$$

where $S_{TDM}$ is a depth sensitivity parameter associated with the TDM 108, and $z_f$ is the focus distance of the imaging system 100. It is appreciated that Equation (4) relates relative depth information contained in $d_{TDM}$ to absolute depth information contained in $z_d$. The depth sensitivity parameter $S_{TDM}$ can depend on various factors including, but not limited to, different parameters of the imaging lens 106 (e.g., focal length, f-number, optical aberrations), the shape and amplitude of the angular response of the TDM 108, the size of the pixels 130, and the wavelength and polarization of the incoming light 102. The depth sensitive parameter $S_{TDM}$ may be determined by calibration. The focus distance $z_f$ is the distance along the optical axis 128 computed from the center of the imaging lens 106 to the focus plane, which is the object plane that is imaged in-focus at the sensor plane of the image sensor 112. The sensor plane is at a distance $z_s$ from the center of the imaging lens 106. The focus distance $z_f$ and the lens-to-sensor distance $z_s$ may be related by the thin-lens equation as follows:

$$\frac{1}{f}=\frac{1}{z_s}+\frac{1}{z_f}, \tag{5}$$

where f is the focal length of the imaging lens 106. In some embodiments, the focal length f may range from about 1 mm to about 50 mm, the lens-to-sensor distance $z_s$ may range from about 1 mm to about 50 mm, and the focus distance $z_f$ may range from about 1 cm to infinity. In some embodiments, the lens-to-sensor distance $z_s$ may be slightly longer than the focal length f, and the focus distance $z_f$ may be significantly longer than both the focal length f and the lens-to-sensor distance $z_s$.

Figure 6:
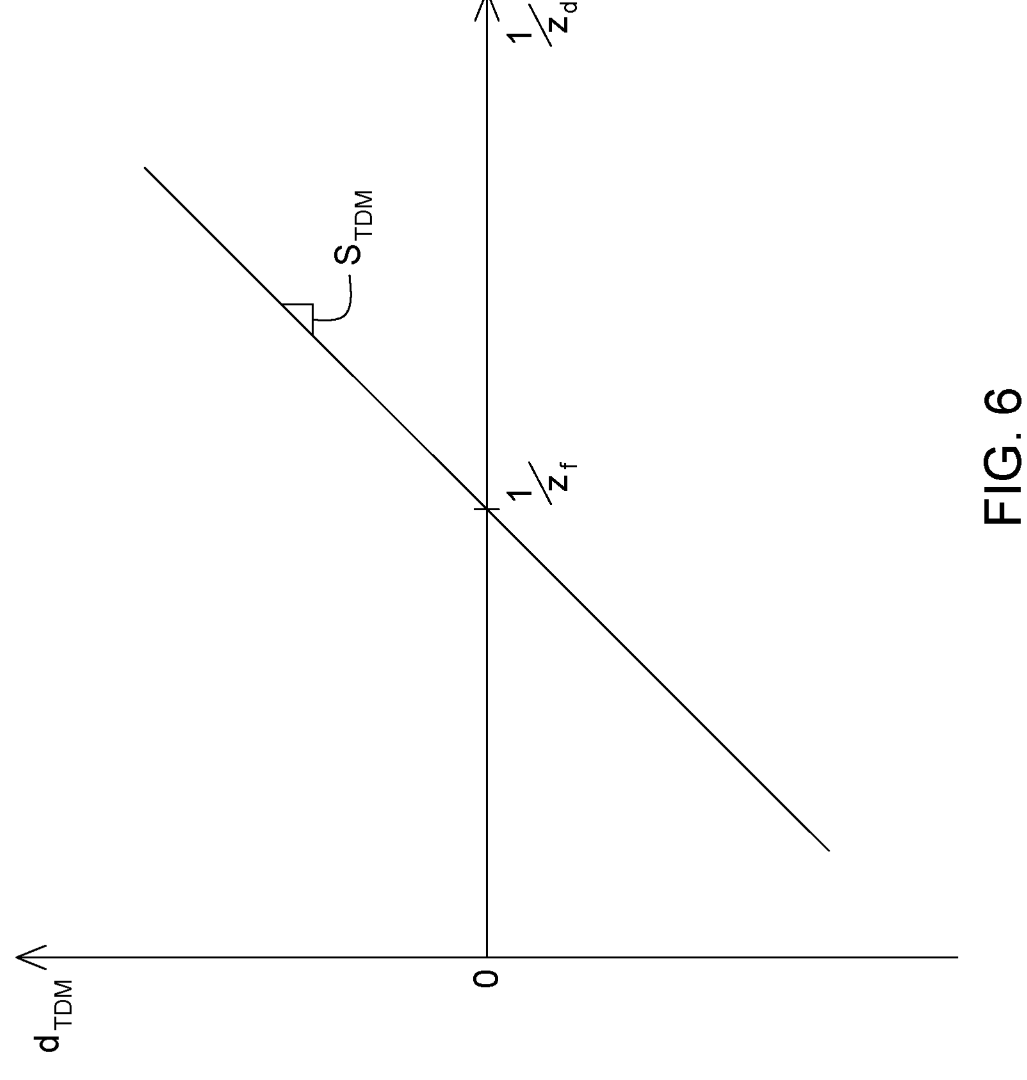
FIG. 6 is a graph depicting a curve of disparity plotted as a function of the inverse of object distance, which can be obtained using a TDM-based imaging system such as disclosed herein.

FIG. 6 is graph depicting a curve of the TDM disparity $d_{TDM}$ given by Equation (4) and plotted as a function of the inverse of the object distance, $1/z_d$. It is seen that $d_{TDM}$ is linearly proportional to $1/z_d$, with a slope of $S_{TDM}$, and equal to zero when $z_d=z_f$. Also, the larger magnitude of $d_{TDM}$, the farther the object 138 is from the focus plane at $z_f$. It is appreciated that, in practice, the curve of $d_{TDM}$ versus $1/z_d$ may deviate from the ideal curve depicted FIG. 6, for example, by following a profile that is not strictly linear. In operation, the TDM disparity $d_{TDM}$ may be derived from pixel response measurements and used to determine the object distance $z_d$ by comparison with calibration data relating $d_{TDM}$ to $z_d$ over a certain range of object distances for one or more values of focus distance $z_f$. The calibration data may include calibration curves and lookup tables.

Various aspects, features, and implementations of methods and systems using depth imaging—including TDM-based depth imaging—for training and deploying neural networks for biometric anti-spoofing will now be described. As noted above, TDM-based imaging systems can measure not only the intensity of light, but also the angle at which light arrives at the image sensor. This angular information enables the reconstruction of the depth dimension of a scene. In some embodiments, the depth information contained in TDM signals can valuably improve the safety of a biometric system, since the depth of printed photos and video replays, which are typical types of spoofing attacks, is mostly flat compared to the depth of real faces or other biometric objects.

Neural Network Training Implementations

Figure 7:
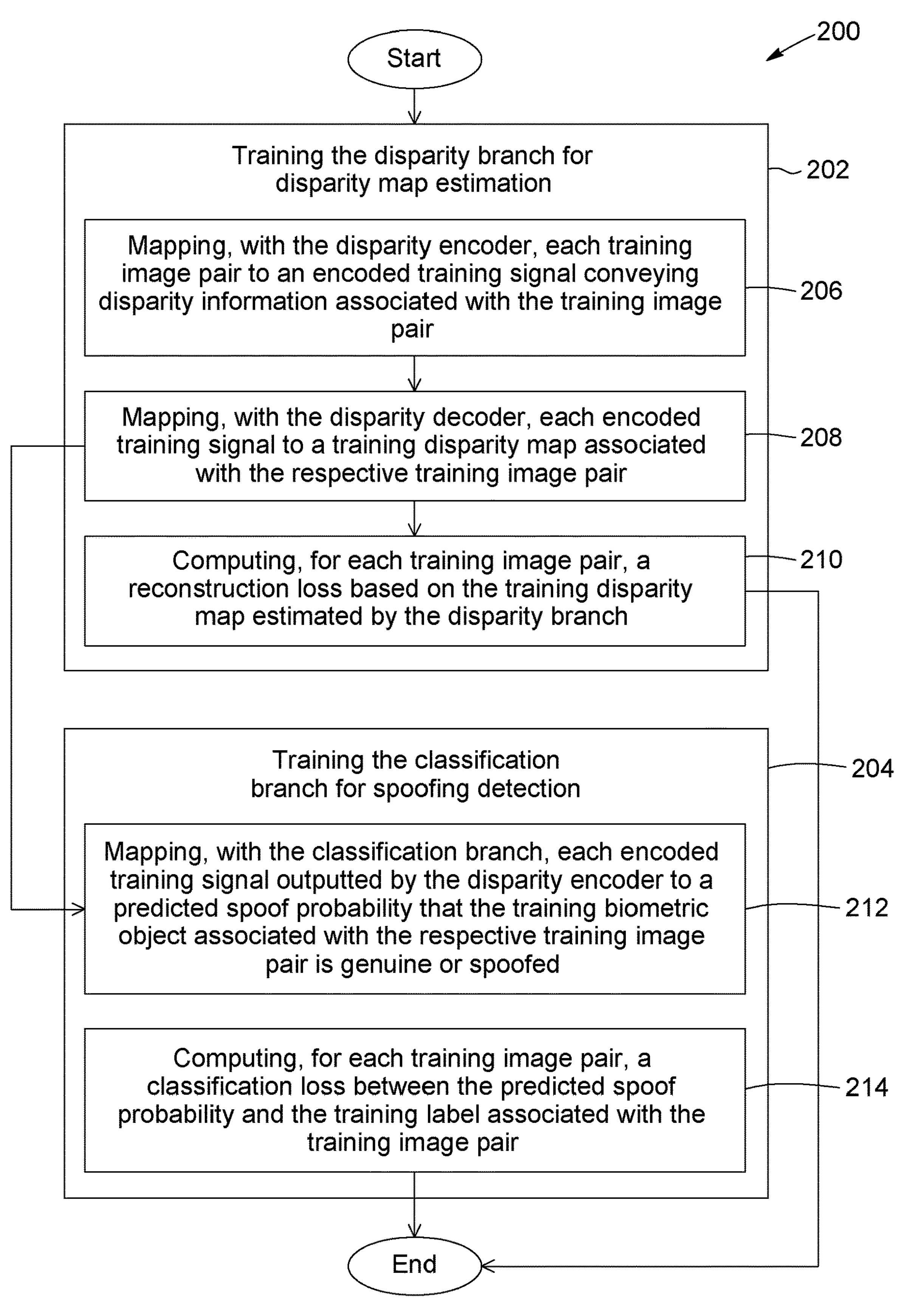
FIG. 7 is a flow diagram of a method of training a neural network to perform image-based biometric anti-spoofing, in accordance with an embodiment.

Referring to FIG. 7, there is provided a method 200 of training a neural network to perform image-based biometric anti-spoofing. The method 200 of FIG. 7 may be implemented in a training system 300, such as the one depicted in FIG. 8, or another suitable training system. The training system 300 of FIG. 8 generally includes an imaging system 100, a processor 134 operatively coupled to the imaging system 100, and a memory 136 operatively coupled to the processor 134. The memory 136 is configured to store thereon the neural network 302, as well as computer readable instructions which, when executed by the processor, cause the processor to perform operations for training the neural network. Depending on the application, the neural network 302 and the computer readable instructions may be stored on the same or on different storage devices, either locally or remotely (e.g., in cloud storage).

Figure 8:
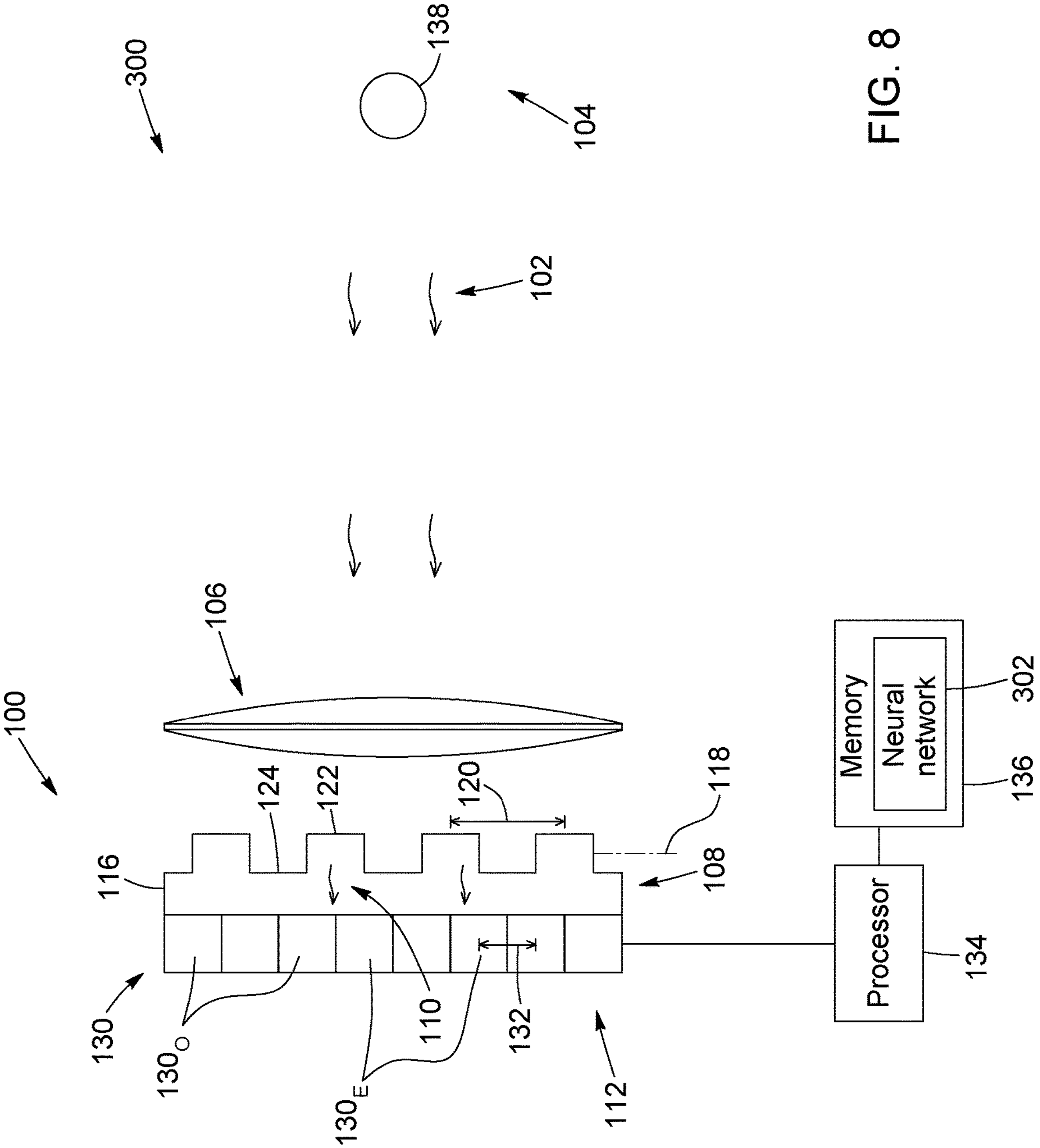
FIG. 8 is a schematic representation of a training system for training a neural network to perform image-based biometric anti-spoofing, in accordance with an embodiment.

The method 200 of training of the neural network 302 can be carried out based on a training dataset. The training dataset can include a set of training image pairs and a respective set of training labels. Each training image pair ($I_+$, $I_-$) includes a first training image $I_+$ and a second training image $I_-$. The pair of training images ($I_+$, $I_-$) provides two different viewpoints of a training biometric object 138 located in a scene 104 within a field of view of the imaging system 100, as illustrated in FIG. 8. In some embodiments, the training biometric object 138 may be a face or a portion of a face of a person. Each training label identifies whether the training biometric object 138 associated with the respective training image pair ($I_+$, $I_-$) is genuine or spoofed. In some embodiments, the set of training image pairs may have been previously captured by the imaging system 100 of the training system 300, and then labeled by assigned the training labels thereto. In other embodiments, the training system 300 may not include an imaging system, so that the set of training image pairs may have been previously captured using one or more other imaging systems. In yet other embodiments, the set of training image pairs may be retrieved from a database, a virtual library, or a storage medium. In some embodiments, the number of training image pairs in the training dataset can range from about one to few thousands to about ten thousands to a few tens of thousands, although values outside this range can be used in other embodiments.

Returning to FIG. 8, the imaging system 100 includes an image sensor 112 having an array of pixels 130, an angle-sensitive optical encoder embodied by a TDM 108 disposed over the image sensor 112, and an imaging lens 106 disposed over the TDM 108. In the illustrated embodiment, the TDM 108 includes a binary phase diffraction grating 116 including a series of alternating ridges 122 and grooves 124 extending along a grating axis 118 at a grating period 120, and the image sensor 110 has a pixel pitch 132 along the grating axis 118 that is equal to half of the grating period 120. The image sensor 112 is configured to detect, as captured image data, light 102 incident from the training biometric object 138 having passed through the TDM 108. The TDM 108 is configured to encode angle-of-incidence-dependent information about the incident light 102 passing therethrough prior to detection by the image sensor 112, as described above. Specifically, the TDM 108 is configured to diffract the light 102 from the training biometric object 138 to generate diffracted light 110 having the angle-dependent information encoded therein for detection by the image sensor 112 as the captured image data. In some embodiments, the captured image data includes, for each training image pair ($I_+$, $I_-$), a first set of pixel responses corresponding to a first set of pixels $\mathbf{130}_O$ of the image sensor 112, and a second set of pixel responses corresponding to a second set of pixels $\mathbf{130}_E$ of the image sensor 112, where the first set of pixel responses and the second set of pixel responses vary differently from each other as a function of angle of incidence and form, respectively, the first training image $I_+$ and the second training image $I_-$ of the training image pair ($I_+$, $I_-$). In such embodiments, each training image pair is thus a TDM image pair.

Figure 9:
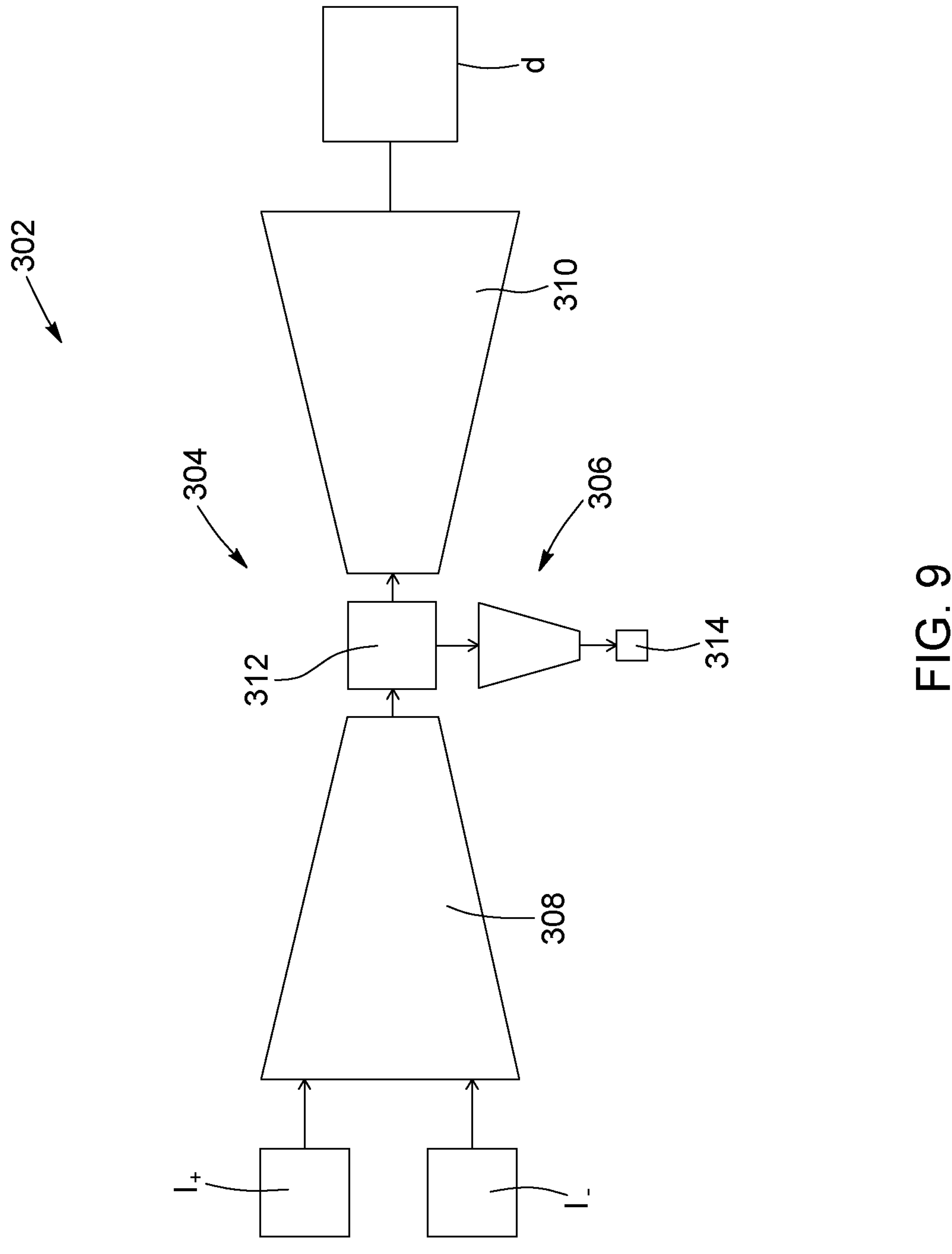
FIG. 9 is a schematic representation of a neural network that can be trained for image-based biometric anti-spoofing, in accordance with an embodiment.

FIG. 9 depicts a schematic representation of an example of a neural network 302 that can be trained for image-based biometric anti-spoofing using the present techniques. The neural network can be a convolutional neural network, another type of feedforward neural network, or any suitable type of artificial neural network. The neural network 302 includes a disparity branch 304 and a classification branch 306. The disparity branch 304 is trained for estimating disparity maps between the training image pairs. The classification branch 306 is trained for detecting whether the training image pairs are genuine or spoofed. The disparity branch 304 includes a disparity encoder 308 and a disparity decoder 310. The term "encoder" generally refers herein to a neural network, or a portion of a neural network, that is configured to receive input data (e.g., an image pair) and to compress the input data into a more compact encoded representation in a reduced dimension. The encoded representation may or may not be readily human interpretable. The term "decoder" generally refers herein to a neural network, or a portion of a neural network, that is configured to receive an encoded representation of input data and to decompress the encoded representation to reconstruct the input data or a joint representation of the input data (e.g. a disparity map of the image pair). In some embodiments, the disparity branch 304 has a Siamese architecture including a pair of sub-branches with shared weights throughout both the disparity encoder 308 and the disparity decoder 310, where the pair of sub-branches includes a first sub-branch and a second sub-branch configured to receive the first training image $I_+$ and the second training image $I_-$ of each training image pair ($I_+$, $I_-$), respectively. It is appreciated that various architectures and configurations of encoder-decoder-type neural networks can be used to implement the disparity branch 304.

Returning to FIG. 7 and referring still to FIG. 9, the training method 200 can include a step 202 of training the disparity branch 304 for disparity map estimation, and a step 204 of training the classification branch 306 for spoofing detection. Training 202 the disparity branch 304 can include a step 206 of mapping, with the disparity encoder 308, each training image pair ($I_+$, $I_-$) to an encoded training signal 312 that conveys disparity information associated with the training image pair ($I_+$, $I_-$). Training 202 the disparity branch 304 can also include a step 208 of mapping, with the disparity decoder 310, each encoded training signal 312 to a training disparity map d associated with the respective training image pair ($I_+$, $I_-$). Training 202 the disparity branch 304 can further include a step 210 of computing, for each training image pair ($I_+$, $I_-$), a reconstruction loss based on the training disparity map d estimated by the disparity branch 304.

In some embodiments, the step 202 of training the disparity branch 304 is performed in an unsupervised manner, that is, without ground-truth disparity information about the set of training image pairs. In some embodiments, the step 210 of computing the reconstruction loss for each training image ($I_+$, $I_-$) can include a step of generating, from the training disparity map d and one of the first and second training images ($I_+$, $I_-$), a reconstructed version of the other one of the first and second training images ($I_+$, $I_-$), and a step of calculating the reconstruction loss based on an image similarity measure between the other one of the first and second training images and its reconstructed version. In some embodiments, the step of generating the reconstructed version of the other one of the first and second training images ($I_+$, $I_-$) can include performing a warping operation using the training disparity map d on the one of the first and second training images ($I_+$, $I_-$).

In such embodiments, the reconstruction loss can be expressed as follows:

$$\sum_{x,y} L(I_-(x, y), W(I_+(x, y),), d((I_+(x, y), I_-(x, y)), \Theta)), \tag{6}$$

where d(·) is the training disparity map estimated by the disparity branch 304 for the training image pair ($I_+$, $I_-$), W(·) represents a warping operator, Θ denotes the network parameters of the disparity branch 304, and the sum is performed on a per pixel (x,y). From Equation (6), the reconstructed version $I_+'$ of the second training image $I_+$ can be obtained by applying the warping operator W($I_-$, d, Θ) on the estimated training disparity map d and the first training image $I_-$, and the reconstructed version $I_-'$ of the first training image $I_-$ can be obtained by applying the warping operator W($I_+$, −d, Θ) on the opposite −d of the estimated training disparity map d and the second training image $I_+$. The warping operation can include a bilinear grid sampling operation, although other warping techniques can be used as appropriate.

In some embodiments, the reconstruction loss can be obtained by computing a similarity cost on both ($I_+$, $I_+'$) and ($I_-$, $I_-'$). In some embodiments, the similarity cost L(x, x') can be expressed as a combination of a structural similarity index measure (SSIM) loss and a Baron loss f(x, a, c). The similarity cost L(x, x') compares both input images with their respective reconstruction, and can be defined as follows:

$$L(x, x') = \frac{1}{N}\sum_{m,n} \alpha \frac{1 - SSIM(x_{m,n}, x'_{m,n})}{2} + (1 - \alpha) f(x_{m,n} - x'_{m,a}, a, c). \tag{7}$$

In some embodiments, the following parameter values were used: α=0.5, a=1, and c=1. The total similarity cost, $L_{pm}$, which can be referred to as a photometric reconstruction loss, can be defined as the sum of both similarity costs:

$$L_{pm} = L(I_+, I_+') + L(I_-, I_-'), . \tag{8}$$

In order to help ensure consistency of the disparity estimation, some implementations of the training method 200 can involve generating two training disparity maps, $d_+$ and $d_-$, for each training image pair ($I_+$, $I_-$), and minimizing a mean-square error (MSE) between the two training disparity maps:

$$L_{cons} = MSE(d_+, -d_-), \tag{9}$$

where the first training disparity map $d_+$ can be generated by inputting the first training image $I_+$ into the first sub-branch and the second training image $I_-$ into the second sub-branch of the disparity branch 304, and the second training disparity map $d_-$ can be generated by inputting the first training image $I_+$ into the second sub-branch and the second training image $I_-$ into the first sub-branch of the disparity branch 304. In some embodiments, the consistency of the disparity estimation can be further improved by computing the photometric reconstruction loss $L_{pm}$ on both $d_+$ and $d_-$.

Referring still to FIGS. 7 and 9, the step 204 of training the classification branch 306 can include a step 212 of mapping, with the classification branch 306, each encoded training signal 312 outputted by the disparity encoder 308 to a predicted spoof probability 314 that the training biometric object associated with the respective training image pair ($I_+$, $I_-$) is genuine or spoofed. It is noted that the input to the classification branch 306 is the encoded training signal 312 outputted by the disparity encoder 308, not the full-resolution training disparity map d outputted by the disparity decoder 310. The encoded training signal 312 can be used as input data for the classification branch 306 during training because it has been found that the encoded training signal 312 can convey sufficient disparity information to reliably be used to perform biometric spoofing classification despite having a lower resolution than the training disparity map d generated by the disparity decoder 310. The step 204 of training the classification branch 306 can also include a step 214 of computing, for each training image pair ($I_+$, $I_-$), a classification loss $L_{cls}$ between the predicted spoof probability and the training label associated with the training image pair ($I_+$, $I_-$). In some embodiments, the classification loss $L_{cls}$ can be based on a focal loss function, which is known to be efficient in heavily unbalanced classification tasks. However, other classification loss functions, for example, a cross-entropy loss function and binary or pixel-wise binary loss functions, can be used in other embodiments. In some embodiments, the consistency of the classification prediction can be further improved by comparing the classification loss $L_{cls}$ obtained by with ($I_+$, $I_-$) as input training data with the classification loss $L_{cls}$ is obtained by inputting ($I_-$, $I_+$) as input training data.

The global training loss can be expressed as follows:

$$L_{global} = L_{pm} + L_{cons} + L_{cls}. \quad (10)$$

Once the global training loss $L_{global}$ has been computed, the weights of the neural network 302 can be updated by backpropagation through the neural network 302. Depending on the application, the weights can be updated after each training sample, after each run of a batch of training samples, or after each epoch (i.e., after each run of all the training samples in the training dataset). It is appreciated that various optimization techniques and algorithms can be used when updating the weight of the neural network 302. Non-limiting examples include gradient descent and its variants, such as stochastic gradient descent, batch gradient descent, and mini-batch gradient descent.

The neural network can be trained for a number of epochs until an end condition has been met. Depending on the application, determining whether the end condition has been met can include, for example, assessing whether the global training loss $L_{global}$ has converged below specified threshold, or assessing whether a specified number of epochs have been completed, or assessing whether a specified allowed computation time has been reached, or any combination thereof. It is appreciated that a variety of computational optimization techniques and algorithms can be used to assess whether the global training loss $L_{global}$ has converged.

In some embodiments, the training of the disparity branch 304 and the training of the classification branch 306 can be performed as a multistage training operation. The multistage training operation can include a first training stage followed by a second training stage. During the first training stage, the disparity branch is pre-trained (e.g., in an unsupervised manner) and the classification branch is not trained. During the second training stage, the pre-trained disparity branch and the untrained classification branch are trained together. It has been found that performing an unsupervised pre-training stage may be helpful in some implementations as it can allow for the disparity information conveyed by the encoded training signal 312 fed to the classification branch 306 to become sufficiently reliable for biometric spoofing prediction. In such embodiments, the global training loss given by Equation (10) can be modified as follows:

$$L_{global} = c_0 L_{pm} + c_1 L_{cons} + c_2 L_{cls}, \quad (11)$$

where the values of the parameters $c_0$, $c_1$, and $c_2$ can be modified depending on the training stage, that is, with $c_0=c_1=1$ and $c_2=0$ during the first training stage and $c_0=c_1=c_2=1$ during the second training stage.

Figure 10:
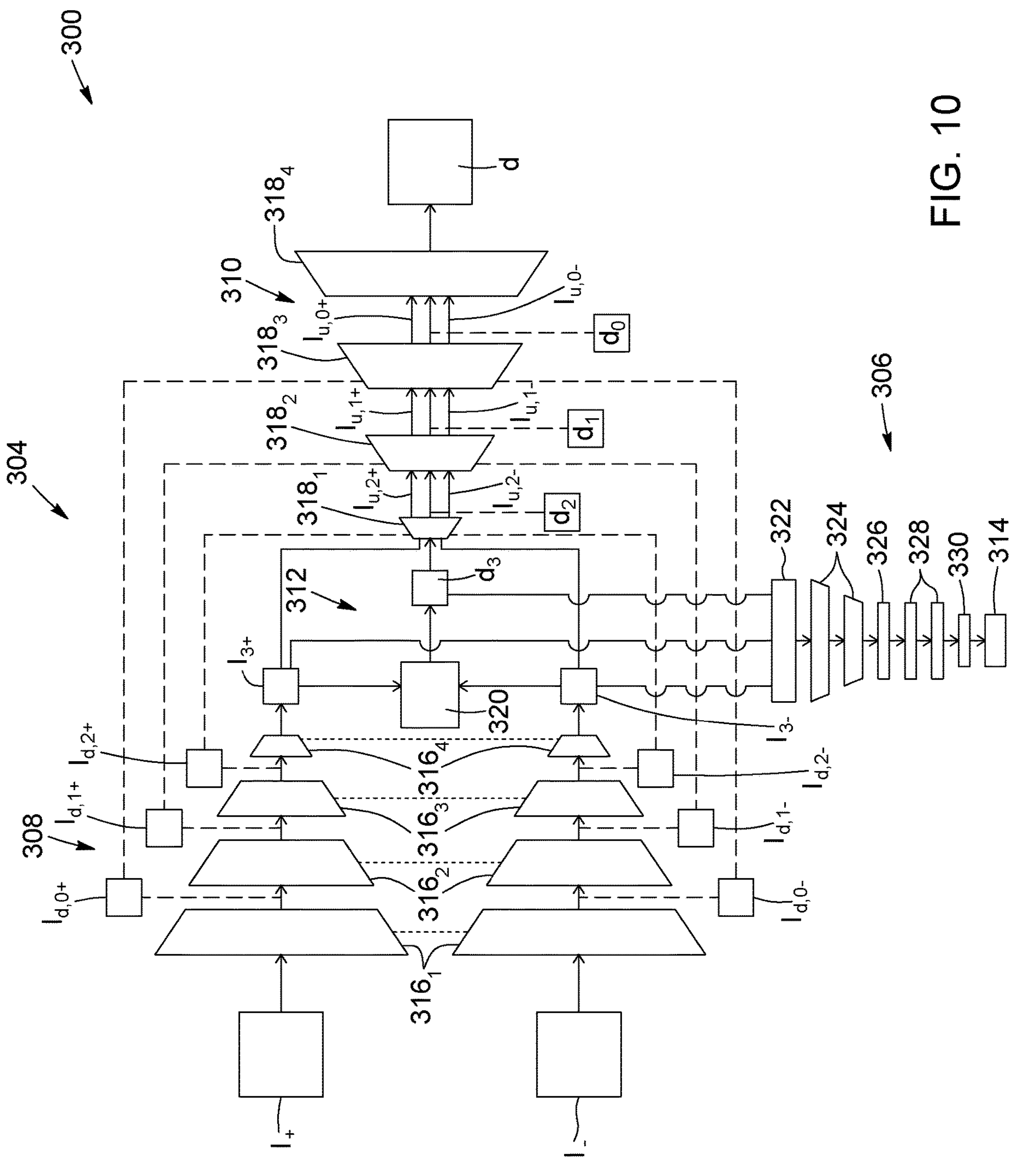
FIG. 10 is a schematic representation of a neural network that can be trained for image-based biometric anti-spoofing, in accordance with another embodiment.

Referring to FIG. 10, there is depicted a schematic representation of another example of a neural network 302 that can be trained for image-based biometric anti-spoofing using the present techniques. The neural network 302 of FIG. 10 is similar to but more detailed than of FIG. 9. The neural network 302 of FIG. 10 has a convolutional architecture, for example, based on a UNet architecture, and includes a disparity branch 304 to be trained for disparity map estimation and a classification branch 306 to be trained for spoof detection. The disparity branch 304 includes a disparity encoder 308 and a disparity decoder 310. The disparity branch 304 has a Siamese architecture including a pair of sub-branches with shared convolution weights throughout the disparity branch 306, where the pair of sub-branches includes a first sub-branch and a second sub-branch configured to receive the first training image $I_+$ and the second training image $I_-$ of each training image pair ($I_+$, $I_-$), respectively. Shared connections between the two sub-branches are depicted as dotted lines in FIG. 10. As described in greater detail below, using shared convolution weights throughout the disparity branch 306 can allow for the computation of feature map pairs at each scale to obtain lower-resolution sub-disparity maps which can be used to refine the training disparity map as the sub-disparity maps are upsampled through the disparity decoder 310.

In some embodiments, the layers of the neural network 302 are configured to apply a parametric rectified linear unit (PReLU) activation function. In some embodiments, each training image pair ($I_+$, $I_-$) has a resolution of 256×256, but any suitable image resolution can be used in other embodiments. It is appreciated that various architectures and configurations of encoder-decoder-type neural networks can be used to implement the disparity branch 304. More details about the parameters of the various layers of the neural network 302 of FIG. 10 are presented in Table I below.

The disparity encoder 308 includes a hierarchy of encoding blocks 316$_1$-316$_4$ corresponding to a hierarchy of scales $s \in \{0, 1, 2, 3\}$, where each encoding block includes one or more neural layers. In some embodiments, the encoding blocks 316$_1$-316$_4$ can be embodied shared residual blocks (ResBlocks), but other types of neural-network-based encore can be used in other embodiments (e.g., MobileNet blocks, InceptionNet blocks, transformer blocks, DenseNet blocks). The disparity decoder 310 includes a hierarchy of decoding blocks 318$_1$-318$_4$ corresponding to a hierarchy of scales $s \in \{0, 1, 2, 3\}$, where each decoding block includes one or more neural layers. In the illustrated embodiment, the disparity encoder 308 and the disparity decoder 310 both include four scales, but more or fewer scales can be used in other embodiments. The number of scales in the disparity encoder 308 may or may not be the same as the number of scales in the disparity decoder 310. In some embodiments, it has been found that the smaller baseline typically associated with TDM image pairs can allow the use of fewer scales than in stereo matching models, which implies that the receptive field required to capture the maximum disparity is smaller.

TABLE I

Network parameters for the neural network of FIG. 10. ResBlocks are convolutional layers with kernel size K = 3 × 3, padding P = 1, and stride S ∈ {1, 2}. The last activation is multiplied by 0.01 to restrict the maximum disparity estimated.

| Layers | Input Size | Parameters |
|---|---|---|
| Disparity branch 304 | | |
| First encoding block $316_1$ | 1 × 256 × 256 | K = 7 × 7, P = 3, S = 1 |
| Second encoding block $316_2$ | 32 × 128 × 128 | 2 layers |
| Third encoding block $316_3$ | 64 × 64 × 64 | 3 layers |
| Fourth encoding block $316_4$ | 128 × 32 × 32 | 3 layers |
| First decoding block $318_1$ | 256 × 16 × 16 | 1 layer |
| Second decoding block $318_2$ | 128 × 32 × 32 | 1 layer |
| Third decoding block $318_3$ | 64 × 64 × 64 | 1 layer |
| Fourth decoding block $318_4$ | 32 × 128 × 128 | 2 layers |
| Tanh activation function | 1 × 256 × 256 | Multiplied by 0.01 |
| Classification branch 306 | | |
| ResBlock 324 | 256 × 16 × 16 | K = 3 × 3, P = 1, S = 2 |
| ResBlock 324 | 16 × 8 × 8 | K = 3 × 3, P = 1, S = 2 |
| GAP layer 326 | 32 × 4 × 4 | |
| Fully connected layers 328 | 32 × 1 × 1 | 2 layers |
| Softmax output layer 330 | 2 × 1 | |

The disparity encoder 308 is configured to map each training image pair ($I_+$, $I_-$) to an encoded training signal 312. The encoded training signal 312 includes a lower-resolution feature map pair ($I_{3+}$, $I_{3-}$) associated with, and of coarser resolution than, the training image pair ($I_+$, $I_-$), and a lower-resolution sub-disparity map $d_3$ associated with the lower-resolution feature map pair ($I_{3+}$, $I_{3-}$). More specifically, the hierarchy of encoding blocks 316₁-316₄ is configured to receive and perform a downsampling operation on each training image pair ($I_+$, $I_-$) to generate the lower-resolution feature map pair ($I_{3+}$, $I_{3-}$) and the lower-resolution sub-disparity map ($I_+$, $I_-$). The downsampling operation can include generating a plurality of downsampled feature map pairs of increasingly coarser resolution by downsampling the training image pair ($I_+$, $I_-$) successively through the hierarchy of encoding blocks $316_1$-$316_4$. The plurality of downsampled feature map pairs can include a plurality of intermediate downsampled feature map pairs ($I_{d,0+}$, $I_{d,0-}$), ($I_{d,1+}$, $I_{d,1-}$), ($I_{d,2+}$, $I_{d,2-}$) and a final downsampled feature map pair. The final downsampled feature map pair is generated by the last encoding block $316_4$ and forms the lower-resolution feature map pair ($I_{3+}$, $I_{3-}$). The lower-resolution sub-disparity map $d_3$ can be computed from the lower-resolution feature map pair ($I_{3+}$, $I_{3-}$) using a sub-disparity block 320 including, for example, a convolution layer and a tan h activation function. In the illustrated embodiment, each encoding block reduces the resolution of its input by a factor of two, and thus the resolution of the lower-resolution feature map pair ($I_{3+}$, $I_{3-}$) is 1/16 of the resolution of the training image pair ($I_+$, $I_-$). Other embodiments may use other values of resolution reduction factor, and different encoding blocks in the hierarchy may or may not use the same value of resolution reduction factor.

The disparity decoder 310 is configured to map each encoded training signal 312 to a training disparity map d associated with the respective training image pair ($I_+$, $I_-$). As noted above, each encoded training signal 312 includes the lower-resolution feature map pair ($I_{3+}$, $I_{3-}$) associated with the training image pair ($I_+$, $I_-$), and the lower-resolution sub-disparity map $d_3$ associated with the lower-resolution feature map pair ($I_{3+}$, $I_{3-}$). The hierarchy of decoding blocks $318_1$-$318_4$ is configured to receive and perform an upsampling operation on each encoded training signal 312 to generate the training disparity map d. The upsampling operation can include a step of generating a plurality of upsampled feature map pairs ($I_{u,2+}$, $I_{u,2-}$), ($I_{u,1+}$, $I_{u,1-}$), ($I_{u,0+}$, $I_{u,0-}$), ($I_{u+}$, $I_{u-}$) of increasingly finer resolution by upsampling the lower-resolution feature map pair ($I_3$+, $I_{3-}$) successively through the hierarchy of decoding blocks $318_1$-$318_4$. The upsampling operation can also include a step of generating a plurality of upsampled sub-disparity maps of increasingly finer resolution by upsampling the lower-resolution sub-disparity map $d_3$ successively through the hierarchy of decoding blocks $318_1$-$318_4$. It is noted that when using shared weights throughout the disparity branch 304, the first and second feature maps at each scale are expected to differ from each other by a slight shift on the disparity axis, and thus this information can be used during training to compute the plurality of upsampled sub-disparity maps.

The plurality of upsampled sub-disparity maps can include a plurality of intermediate upsampled sub-disparity maps $d_2$, $d_1$, $d_0$ and a final upsampled sub-disparity map. The final upsampled sub-disparity map is generated by the last decoding block $318_4$ and forms the full-resolution training disparity map d associated with the training image pair ($I_+$, $I_-$) inputted to the disparity encoder 308. In the illustrated embodiment, each decoding block increases the resolution of its input by a factor of two, and thus the resolution of the training disparity map d is 16 times the resolution of the lower-resolution sub-disparity map $d_3$, and thus the same as the resolution of the training image pair ($I_+$, $I_-$). Other embodiments may use other values of resolution increase factor, and different decoding blocks in the hierarchy may or may not use the same value of resolution increase factor. In some embodiments, the training disparity map d can be scaled using a tan h activation function with an appropriate scale factor $\alpha$, for example, $\alpha$=0.01. The value of a can limit the disparity range to [$-\alpha$, $\alpha$] and can be chosen depending of the sensor resolution. In some embodiments, the lower-resolution sub-disparity map $d_3$ and the plurality of intermediate upsampled sub-disparity maps $d_2$, $d_1$, $d_0$ can also be scaled in this manner.

In some embodiments, the computation of the reconstruction loss can be based on the lower-resolution sub-disparity map $d_3$ and the plurality of intermediate upsampled sub-disparity maps $d_2$, $d_1$, $d_0$. For example, the following loss function can be defined and added to $L_{pm}$ and $L_{cons}$ when computing $L_{global}$.

$$L_{pm,s} = L\left(I_{u,s+}, I'_{u,s+}\right) + L\left(I_{u,s-}, I'_{u,s-}\right). \tag{12}$$

$$L_{cons,s} = MSE(d_{s+}, -d_{s-}), \tag{13}$$

where $I'_{u,s+}$ is a reconstructed version of feature map $I_{u,s+}$ generated from sub-disparity map $d_s$ and feature map $I_{u,s-}$, and $I'_{u,s-}$ is a reconstructed version of feature map $I_{u,s-}$ generated from sub-disparity map $d_s$ and feature map $I_{u,s+}$. In some embodiments, the reconstructed feature maps can be generated using warping operations.

Referring still to FIG. 10, the classification branch 306 is configured to receive the encoded training signal 312 from the disparity encoder 308, which includes the lower-resolution sub-disparity map $d_3$ and, optionally, the lower-resolution feature map pair ($I_{3+}$, $I_{3-}$). As noted above, it has been found that the lower-resolution disparity information contained in the encoded training signal 312 is sufficient for biometric spoofing detection. In the illustrated embodiment, the classification branch 306 includes a concatenation layer

322 configured to concatenate the lower-resolution sub-disparity map $d_3$ and the lower-resolution feature map pair ($I_{3+}$, $I_{3-}$), a pair of residual blocks 324, a global averaging pooling (GAP) layer 326, a pair of fully connected layers 328, and a softmax output layer 330. The classification branch 306 is configured to output a probability 314 that each training image pair ($I_+$, $I_-$) is genuine or spoofed. For example, the softmax output layer 330 may be configured to output the probability 314 as a 2×1 vector p=[probability of genuine biometric object, 1—probability of genuine biometric object).

Figure 11:
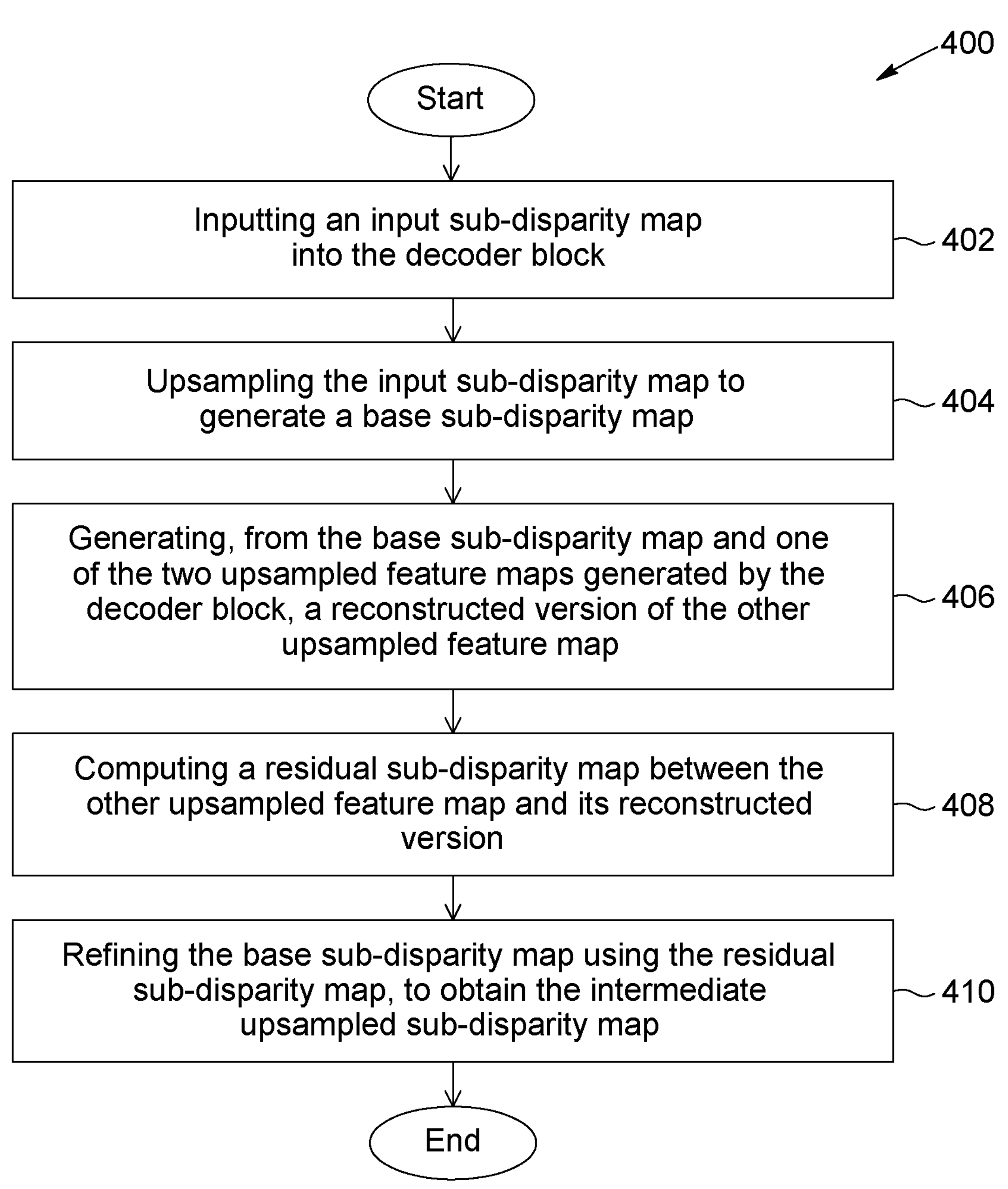
FIG. 11 is a flow diagram of a method for disparity upsampling, in accordance with an embodiment.
Figure 12:
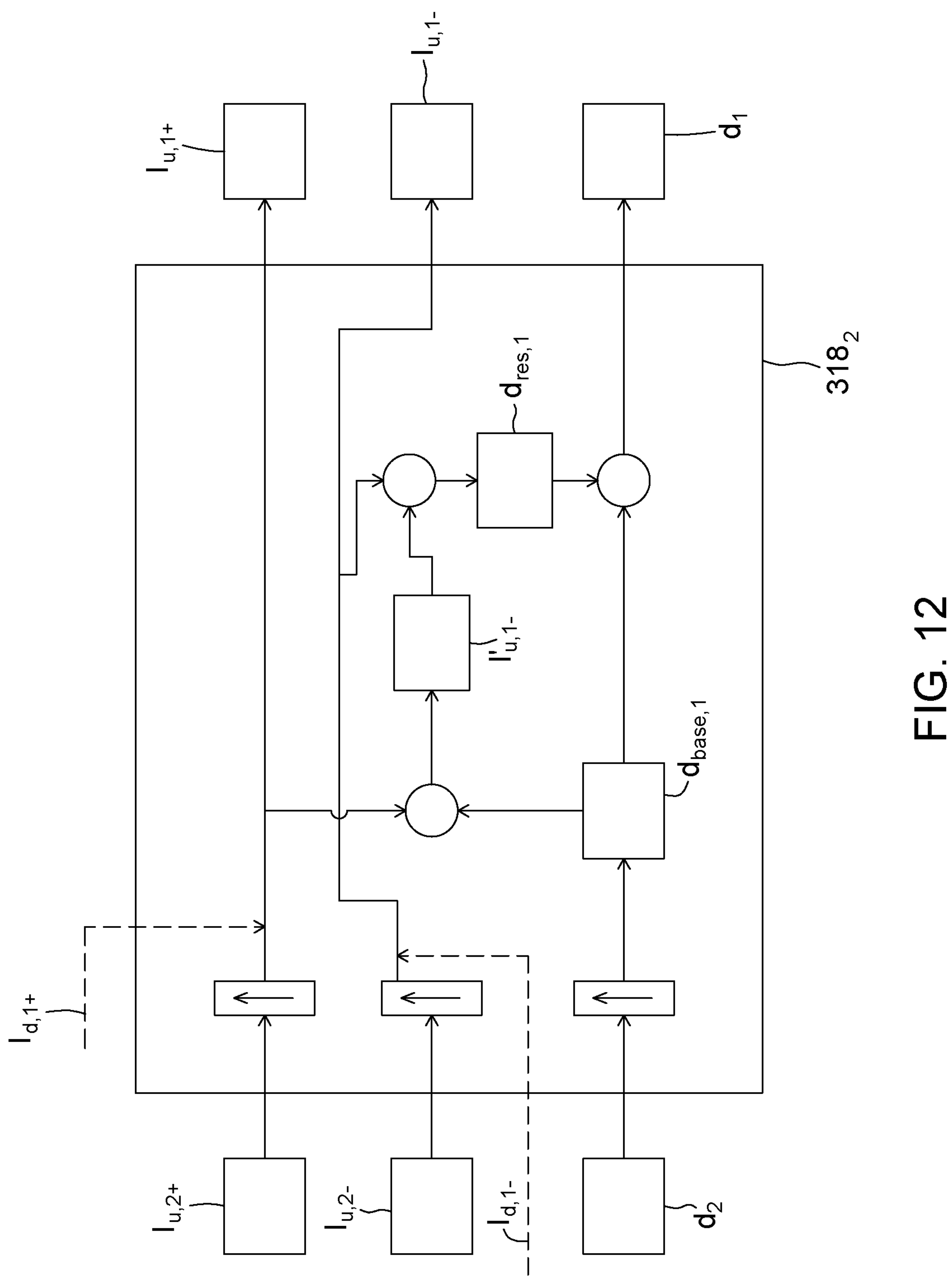
FIG. 12 is a schematic representation of a decoding block configured to implement the method of FIG. 11, in accordance with an embodiment.

Referring to FIG. 11, there is provided a method 400 for disparity upsampling. The method 400 of FIG. 11 may be implemented in a decoding block 318$_1$-318$_4$ such as the ones depicted in FIG. 10. FIG. 12 illustrates an exemplary configuration of a decoding block 318$_2$ configured to carry out the method 400 of FIG. 11 for generating an intermediate upsampled sub-disparity map $d_1$. Referring to FIGS. 10 to 12, the method 400 can include a step 402 of inputting an input sub-disparity map $d_2$ into the decoder block 318$_2$. It is appreciated that depending on the scale of the decoder block configured to implement the disparity upsampling method 400, the input sub-disparity map can be the lower-resolution sub-disparity map $d_3$ (for decoder block 318$_1$) or the intermediate upsampled sub-disparity map $d_2$, $d_1$, or $d_0$ generated by the previous decoder block in the hierarchy (for decoder blocks 318$_2$-318$_4$).

The method 400 can also include a step 404 of upsampling the input sub-disparity map $d_2$ to generate a base sub-disparity map $d_{base,1}$. In some embodiments, the upsampling module can use bilinear sampling to obtain $d_{base,1}$ from $d_2$. The method 400 can further include a step 406 of generating, from the base sub-disparity map $d_{base,1}$ and one of the first and second upsampled feature maps of the upsampled feature map pair (e.g., $I_{u,1+}$, in FIG. 12) generated by the decoder block 318$_2$, a reconstructed version (e.g., $I'_{u,-}$ in FIG. 12) of the other one of the first and second upsampled feature maps (e.g., $I_{u,-}$ in FIG. 12). In some embodiments, generating the reconstructed version of the other one of the first and second upsampled feature maps includes performing a warping operation using the base sub-disparity map $d_{base,1}$ on the one of the first and second upsampled feature maps (e.g., $I_{u,+}$ in FIG. 12). In some embodiments, one of the intermediate downsampled feature map pairs (e.g., $I_{d,1+}$ and $I_{d,1-}$ in FIG. 12) generated by the disparity encoder 308 can be fed, via skip connections, to the decoder block 318$_2$, and used in generating the upsampled feature map pair (e.g., $I_{d,1+}$ and $I_{d,1-}$ in FIG. 12.)

The method 400 can also include a step 408 of computing a residual sub-disparity map $d_{res,1}$ between the other one of the first and second upsampled feature maps (e.g., $I_{u,1-}$ in FIG. 12) and the reconstructed version thereof (e.g., $I'_{u,1-}$ in FIG. 12), for example, using a convolution layer and a tan h activation function. The residual sub-disparity map $d_{res,1}$ can be inferred from local dissimilarities between the other one of the first and second upsampled feature maps and its reconstructed version (e.g., between $I_{u,1-}$ and $I'_{u,1-}$ in FIG. 12). The method 400 can further include a step 410 of refining the base sub-disparity map $d_{base,1}$ using the residual sub-disparity map $d_{res,1}$, to obtain the intermediate upsampled sub-disparity map $d_1$, which can then be fed to the next decoder block. It is appreciated that implementing the method 400 of FIG. 11 at each scale of the hierarchy of decoding blocks 318$_1$-318$_4$ establishes a connection between the training disparity map d outputted by the disparity decoder 310 and the lower-resolution sub-disparity map $d_3$ outputted by disparity encoder 308 and inputted to the classification branch 306. This connection can help ensure that meaningful disparity information are imparted to the lower-resolution sub-disparity map $d_3$ and, thus, fed to the classification branch 306 for spoof detection.

Neural Network Deployment Implementations

Figure 13:
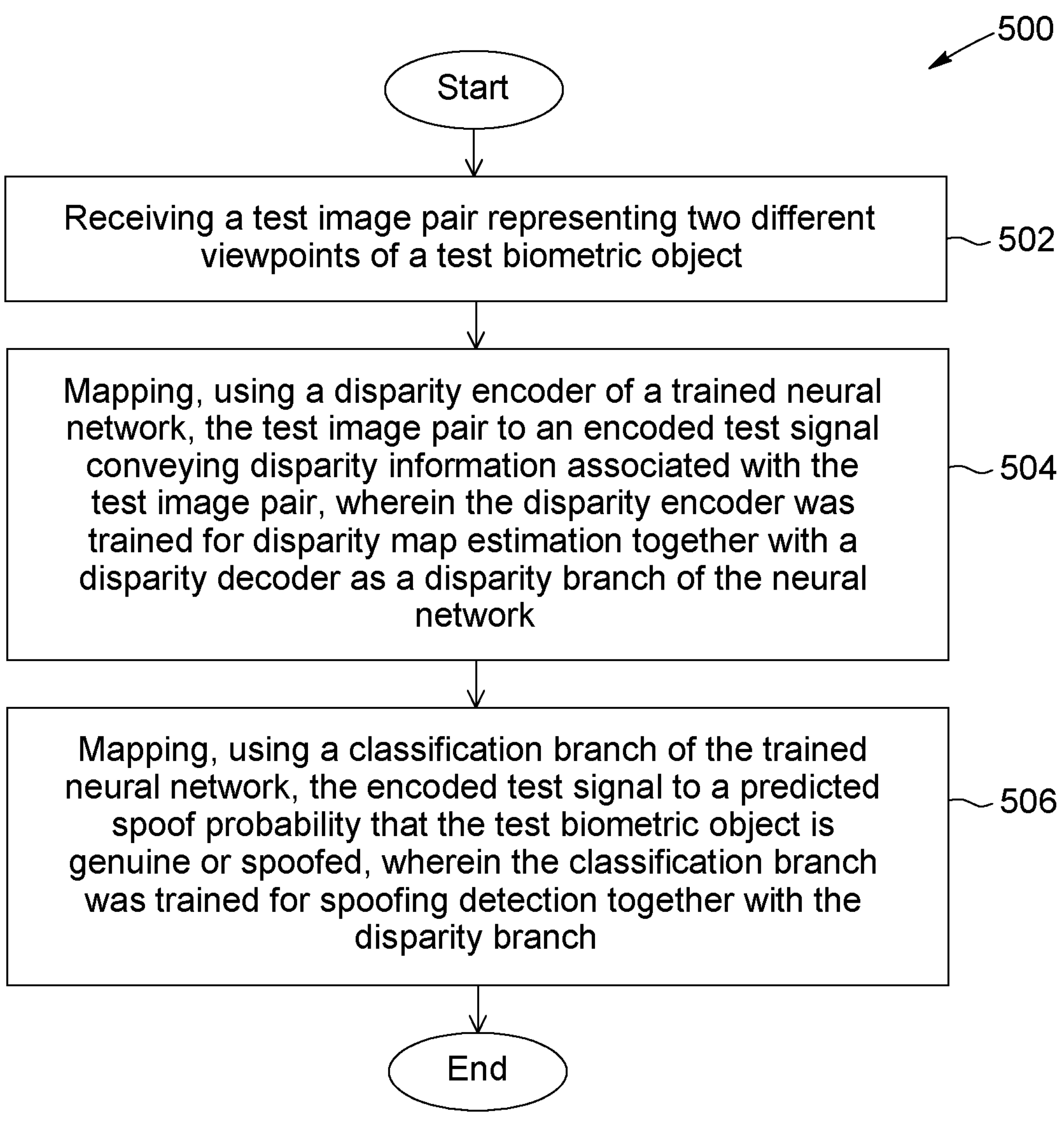
FIG. 13 is a flow diagram of a method for spoofing detection in a test biometric object, in accordance with an embodiment.
Figure 14:
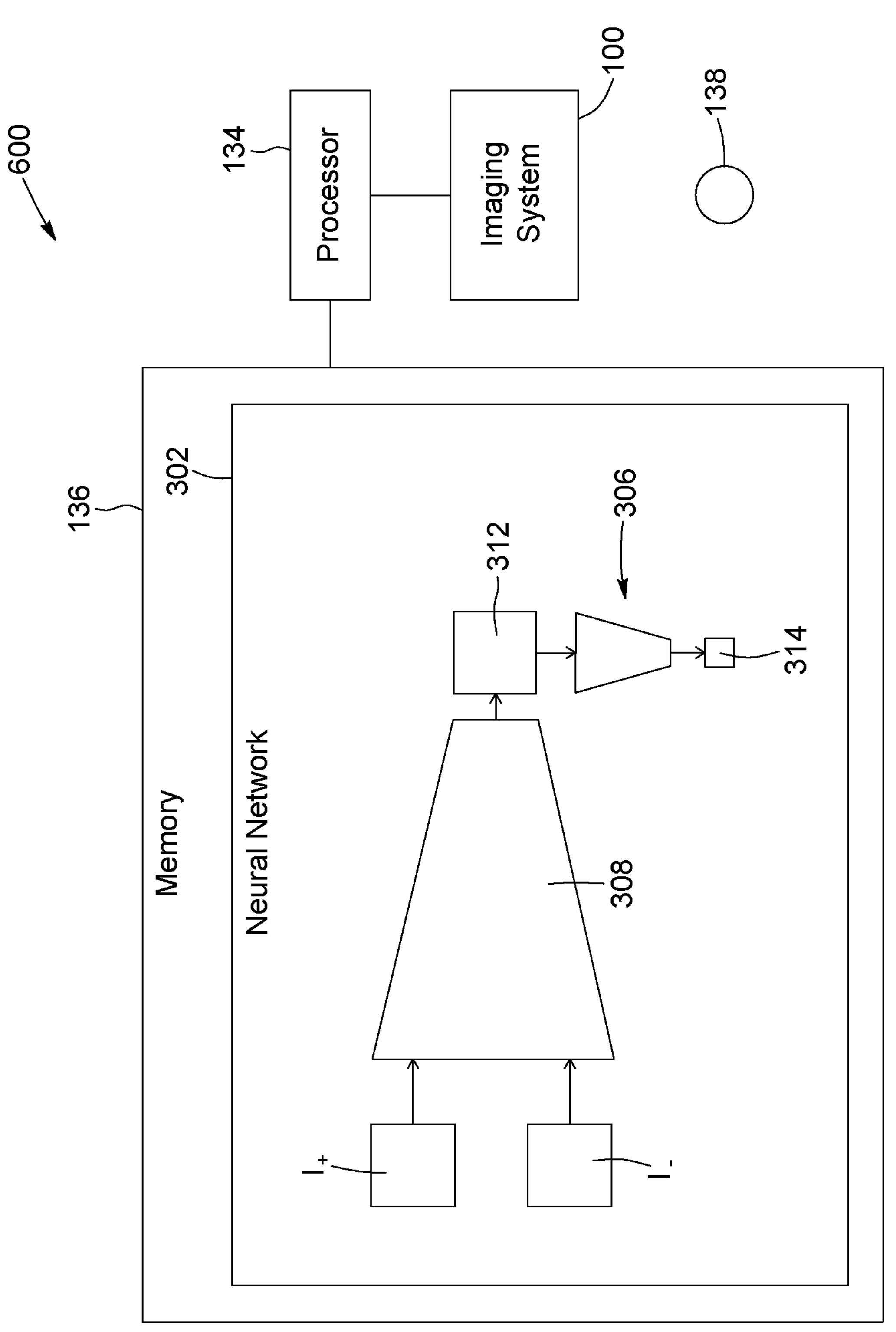
FIG. 14 is a schematic representation of a system for spoofing detection in a test biometric object, in accordance with an embodiment.

Referring to FIG. 13, there is provided a method 500 of spoofing detection in a test biometric object. The method 500 of FIG. 13 may be implemented in a spoofing detection system 600, such as the one depicted in FIG. 14, or another suitable system. The spoofing detection system 600 of FIG. 14 generally includes an imaging system 100, a processor 134 operatively coupled to the imaging system 100, and a memory 136 operatively coupled to the processor 134. The imaging system 100 can be a TDM-based imaging system such as those described herein, or another suitable imaging system, such as described below. The memory 136 is configured to store thereon a neural network 302 that was trained to perform image-based biometric anti-spoofing, as well as computer readable instructions which, when executed by the processor, cause the processor to perform operations for spoofing detection. The trained neural network 302 may have been trained using the training methods and systems disclosed herein. The trained neural network 302 generally includes a disparity encoder 308 and a classification branch 306. The disparity encoder 308 and the classification branch 306 of FIG. 14 may share several features with those of FIGS. 9 and 10, which need not be described in detail again. For example, the 40. Depending on the application, the trained neural network 302 and the computer readable instructions may be stored on the same or on different storage devices, either locally or remotely (e.g., in cloud storage).

The spoof detection method 500 can include a step 502 of receiving a test image pair ($I_+$, $I_-$) including a first test image $I_+$ and a second test image $I_-$ representing two different viewpoints of the test biometric object 138. In some embodiments, the disparity encoder 308 may have a Siamese convolutional architecture with a pair of sub-branches with shared convolutional weights, where each sub-branch is configured a respective one of the two test images ($I_+$, $I_-$). In some embodiments, the step 502 of receiving the test image pair ($I_+$, $I_-$) can include capturing the test image pair ($I_+$, $I_-$) using an imaging system (e.g., the TDM-based imaging system 100 in FIG. 14). In other embodiments, the step 502 of receiving the test image pair ($I_+$, $I_-$) retrieving or providing a previously test image pair ($I_+$, $I_-$), for example from a database, a virtual library, or a storage medium. In some embodiments, the test biometric object 138 can be a face or a portion of a face of a person. For example, the spoofing detection 600 of FIG. 14 may be implemented on a mobile phone and may be configured to perform user authentication by detecting whether the test biometric object 138 corresponds to a genuine or spoofed face of a user.

The spoof detection method 500 can also include a step 504 of mapping, using the disparity encoder 308 of the trained neural network 302, the test image pair ($I_+$, $I_-$) to an encoded test signal 312 that conveys disparity information associated with the test image pair ($I_+$, $I_-$). As described above with respect to the encoded training signal generated during training of the neural network 302, the encoded test signal 312 can include a lower-resolution feature map pair associated with, and of coarser resolution than, the test image pair ($I_+$, $I_-$), and a lower-resolution sub-disparity map associated with the lower-resolution feature map pair. The disparity encoder 308 was trained for disparity map estimation together with a disparity decoder (not shown in FIG. 14; see, e.g., FIGS. 9 and 10). During training, the disparity encoder 308 and the disparity decoder formed a disparity branch of the neural network 302, as described above with reference to FIGS. 7 to 10. The disparity decoder that was used during training is removed or otherwise not used at deployment, that is, when performing actual spoof detection on the test image pair ($I_+$, $I_-$) with the trained neural network 302. It is appreciated that not using the disparity decoder at deployment can make the spoofing detection system 600 faster, more efficient, and less computationally demanding.

The spoof detection method 500 can further include a step 506 of mapping, using the classification branch 306 of the trained neural network 302, the encoded test signal 312 to a predicted spoof probability 314 that the test biometric object 138 is genuine or spoofed. The classification branch 306 was trained for spoofing detection together with the disparity branch, for example, as described above with reference to FIGS. 7 to 10. As noted above, the input to the classification branch 306 is the encoded test signal 312 outputted by the disparity encoder 308, not the full-resolution disparity map outputted by the disparity decoder used during training. This is because the disparity encoder 308 was trained to generate the encoded training signal with meaningful disparity information encoded therein, making the encoded test signal 312 generated at inference sufficiently reliable to be used by the classification branch 306 to perform biometric spoofing detection, despite its resolution being lower than that of the full-resolution disparity map generated by the disparity decoder during training.

In some embodiments, the spoof detection method 500 can include a step of outputting a spoof detection result for the test image based on the predicted spoof probability. In some embodiments, the outputting step can include outputting generating an alert in response to a prediction that the test biometric object is spoofed. The alert can be a visual alert, an audible alert, a vibrational signal, an electrical signal, a wireless signal, or any combination thereof.

In some embodiments, the spoof detection method 500 can include a step of taking an action based on the predicted spoof probability. For example, the action can include granting or denying user access to an electronic device (e.g., a mobile) on which the spoof detection system 600 is implemented in response a determination that the test biometric object (e.g., the face of a user) is real or fake, respectively.

Other Depth Imaging System Implementations

Figure 15:
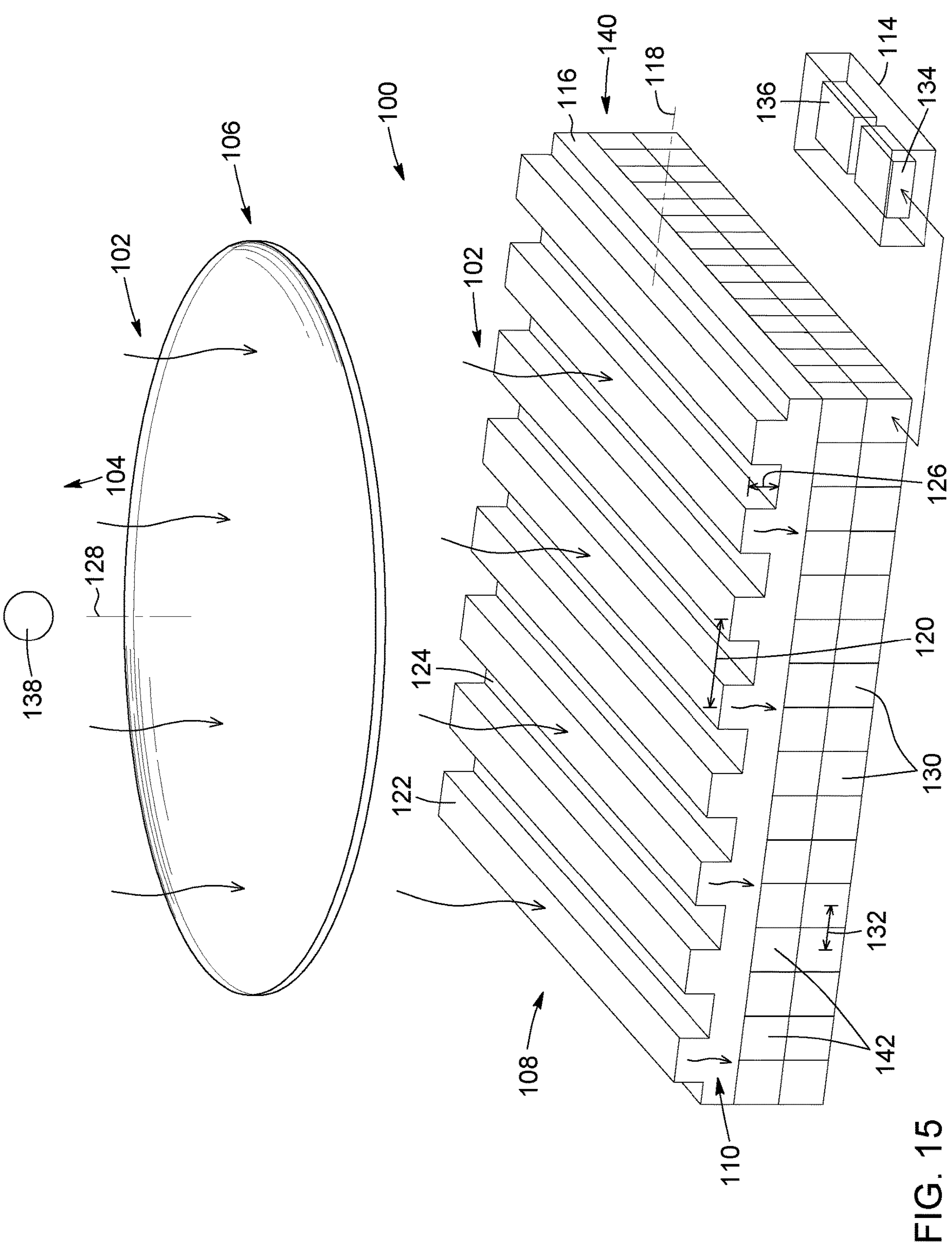
FIG. 15 is a schematic perspective view of another example of a TDM-based imaging system, which can be used in the neural-network-based biometric anti-spoofing techniques disclosed herein.

Referring to FIG. 15, there is illustrated another embodiment of a depth imaging system 100 that can be used in the neural-network-based biometric anti-spoofing techniques disclosed herein. The embodiment of FIG. 15 shares several features with the embodiment of FIGS. 1 and 2, which will not be described again other than to highlight differences between them. In contrast to the embodiment of FIGS. 1 and 2, which is intended for monochrome applications, the embodiment of FIG. 15 is intended for color applications. In FIG. 15, the image sensor 112 includes a color filter array 140 interposed between the TDM 108 and the array of pixels 130. The color filter array 140 includes a plurality of color filters 142 arranged in a mosaic color pattern. The color filter array 140 is configured to filter the diffracted light 110 produced by the TDM 108 spatially and spectrally according to the mosaic color pattern prior to detection of the diffracted light 110 by the array of pixels 130. In some embodiments, the color filters 142 may include red, green, and blue filters, although other filters may alternatively or additionally be used in other embodiments, such as yellow filters, cyan filters, magenta filters, clear or white filters, and infrared filters. In some embodiments, the mosaic color pattern of the color filter array 140 may be an RGGB Bayer pattern, although other mosaic color patterns may be used in other embodiments, including both Bayer-type and non-Bayer-type patterns. In color implementations, the determination of uniform field image data from the pixel responses measured by the pixels 130 can be performed on a per-color basis by parsing the pixel data according to color components, for example, based on techniques such as or similar to those described in co-assigned international patent applications PCT/CA2017/050686 (published as WO 2017/210781), PCT/CA2018/051554 (published as WO 2019/109182), and PCT/CA2020/050760 (published as WO 2020/243828).

For simplicity, several embodiments described above include TDMs provided with a single diffraction grating and, thus, a single grating orientation. However, it is appreciated that, in practice, TDMs will generally include a large number of diffraction gratings and may include multiple grating orientations. For example, in some embodiments, the TDM may include a first set of diffraction gratings and a second set of diffraction grating, where the grating axes of the diffraction gratings of the first set are orthogonal to the grating axes of the diffraction gratings of the second set. Reference is made to co-assigned international patent applications PCT/CA2021/051635 (published as WO 2022/104467) and PCT/CA2022/050018 (published as WO 2022/150903). In some embodiments, the first set of diffraction gratings and the second set of diffraction gratings may be interleaved in rows and columns to define a checkerboard pattern. It is appreciated, however, that any other suitable regular or irregular arrangements of orthogonally or non-orthogonally oriented sets of diffraction gratings may be used in other embodiments. For example, in some variants, the orthogonally oriented sets of diffraction gratings may be arranged to alternate only in rows or only in columns, or be arranged randomly. Other variants may include more than two sets of diffraction gratings.

In addition, although several embodiments described above include TDMs provided with one-dimensional, binary phase gratings formed of alternating sets of parallel ridges and grooves defining a square-wave grating profile, other embodiments may use TDMs with other types of diffraction gratings. For example, other embodiments may use diffraction gratings where any, some, or all of the grating period, the duty cycle, and the step height are variable; diffraction gratings with non-straight features perpendicular to the grating axis; diffraction gratings having more elaborate grating profiles; 2D diffraction gratings; photonic crystal diffraction gratings; and the like. The properties of the diffracted light may be tailored by proper selection of the grating parameters. Furthermore, in embodiments where TDMs include multiple sets of diffraction gratings, the diffraction gratings in different sets need not be identical. In general, a TDM may be provided as a grating tile made up of many grating types, each grating type being characterized by a particular set of grating parameters. Non-limiting examples of such grating parameters include the grating orientation, the grating period, the duty cycle, the step height, the number of grating periods, the lateral offset with respect to the underlying pixels and/or color filters, the grating-to-sensor distance, and the like.

Figure 16:
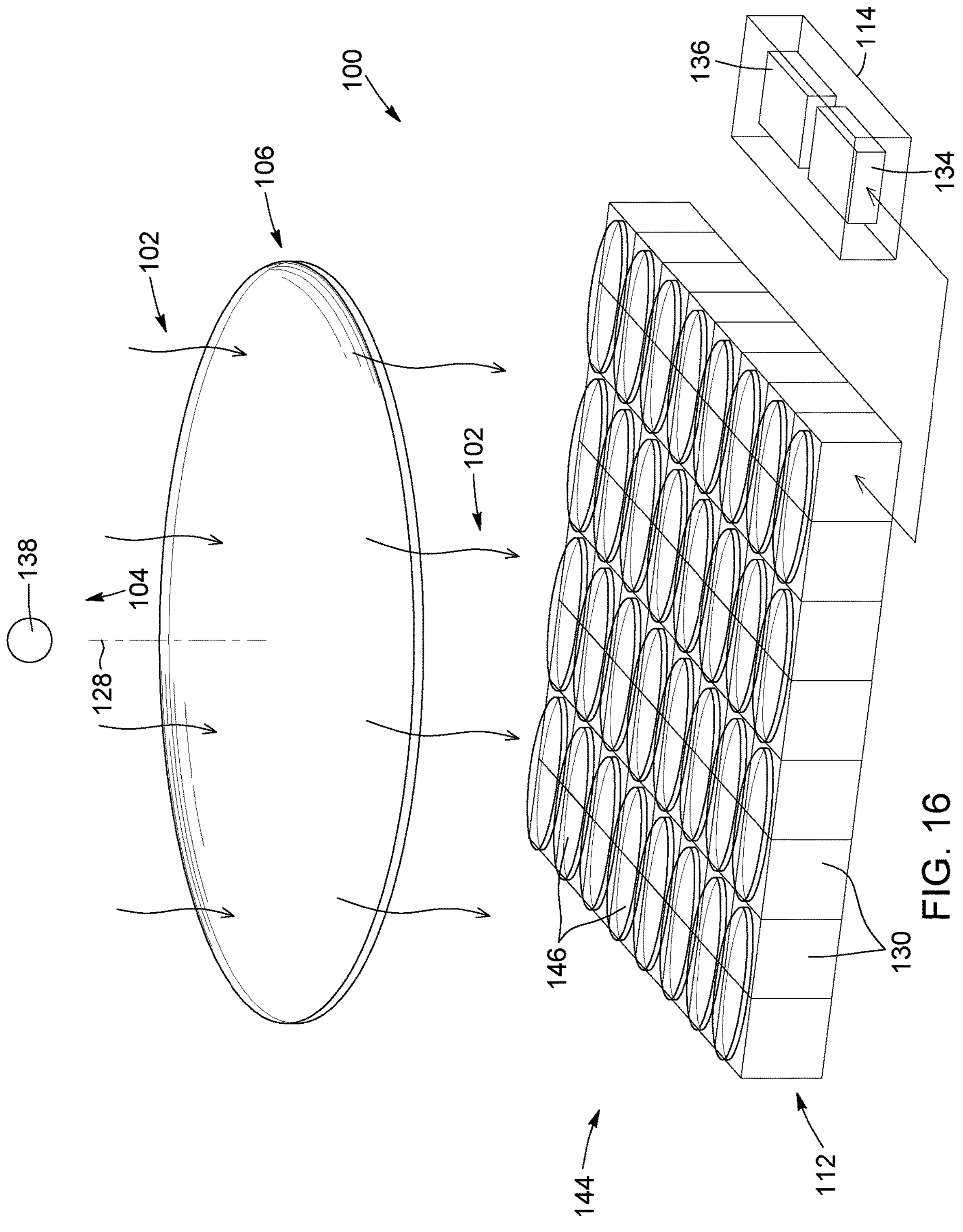
FIG. 16 is a schematic perspective view of another example of a monoscopic depth imaging system, which can be used in the neural-network-based biometric anti-spoofing techniques disclosed herein.

Furthermore, although several embodiments described above use TDMs as angle-sensitive optical encoders, other embodiments may use other types of optical encoders with angle encoding capabilities. Referring to FIG. 16, there is illustrated another embodiment of a monocular depth imaging system 100 that can be used in the neural-network-based biometric anti-spoofing techniques disclosed herein. The imaging system 100 is configured for capturing image data representative of light 102 received from a scene 104 containing a training or test biometric object 138. The imaging system 100 generally includes an imaging lens 106, a microlens array 144 having a plurality of microlenses 146, an image sensor 112 having a plurality of pixels 130, and a computer device 114 including a processor 134 and a memory 136. In the illustrated embodiment, the microlens array 144 acts as an optical encoder of angle-of-incidence information. Each microlens 146 of the microlens array 144 covers two pixels 130 of the image sensor 112. The microlens array 144 is configured to direct the light 102 received from the scene 104 onto the image sensor 112 for detection by the pixels 130. The computer device 114 is configured to process the image data generated by the image sensor 112 to determine angle-of-incidence information about the received light 102, from which depth information about the scene 104 may be determined. It is appreciated that FIG. 16 is a simplified schematic representation that illustrates a number of components of the imaging system 100, such that additional features and components that may be useful or necessary for the practical operation of the imaging system 100 may not be specifically depicted.

The provision of the microlens array 144 interposed between the image sensor 112 and the scene 104, where each microlens 146 covers two or more pixels 130 of the image sensor 112, can impart the imaging system 100 with 3D imaging capabilities, including depth sensing capabilities. This is because the different pixels 130 in each pixel pair or group under a given microlens 146 have different angular responses, that is, they may produce different pixel responses in response to varying the angle of incidence of the received light 102, similar to the even and odd pixel responses introduced above with respect to TDM implementations. This means that the imaging system 100 illustrated in FIG. 16 can be used to provide image pairs for use as input to a neural network for biometric spoofing detection, both during the training phases and the deployment phases. In such implementations, the pixels 130 of the image sensor 112 may be referred as phase detection pixels. It is appreciated that although the embodiment of FIG. 16 depicts a configuration where each microlens 146 covers a group of 2×1 pixels 130, other configurations are possible in other embodiments. For example, in some embodiments, each microlens may cover a group of 2×2 pixels. Such arrangements can be referred to as quad-pixel arrangements. In other embodiments, each microlens may cover one pixel, but the pixel under the microlens may be split in two subpixels, thus providing a configuration similar to the one shown in FIG. 16. Such arrangements can be referred to as dual-pixel arrangements. It is appreciated that dual-pixel arrangements are considered herein as embodiments where each microlens covers two pixels of the image sensor, as in FIG. 16. In yet other embodiments, each microlens may cover one pixel, but the pixel under the microlens may be half-masked to provide angle-sensitivity capabilities.

It is appreciated that the structure, configuration, and operation of imaging devices using phase detection pixels, quad-pixel technology, dual-pixel technology, half-masked pixel technologies, and other approaches using microlens arrays over pixel arrays to provide 3D imaging capabilities are generally known in the art, and need not be described in detail herein other than to facilitate an understanding of the present techniques.

Figure 17:
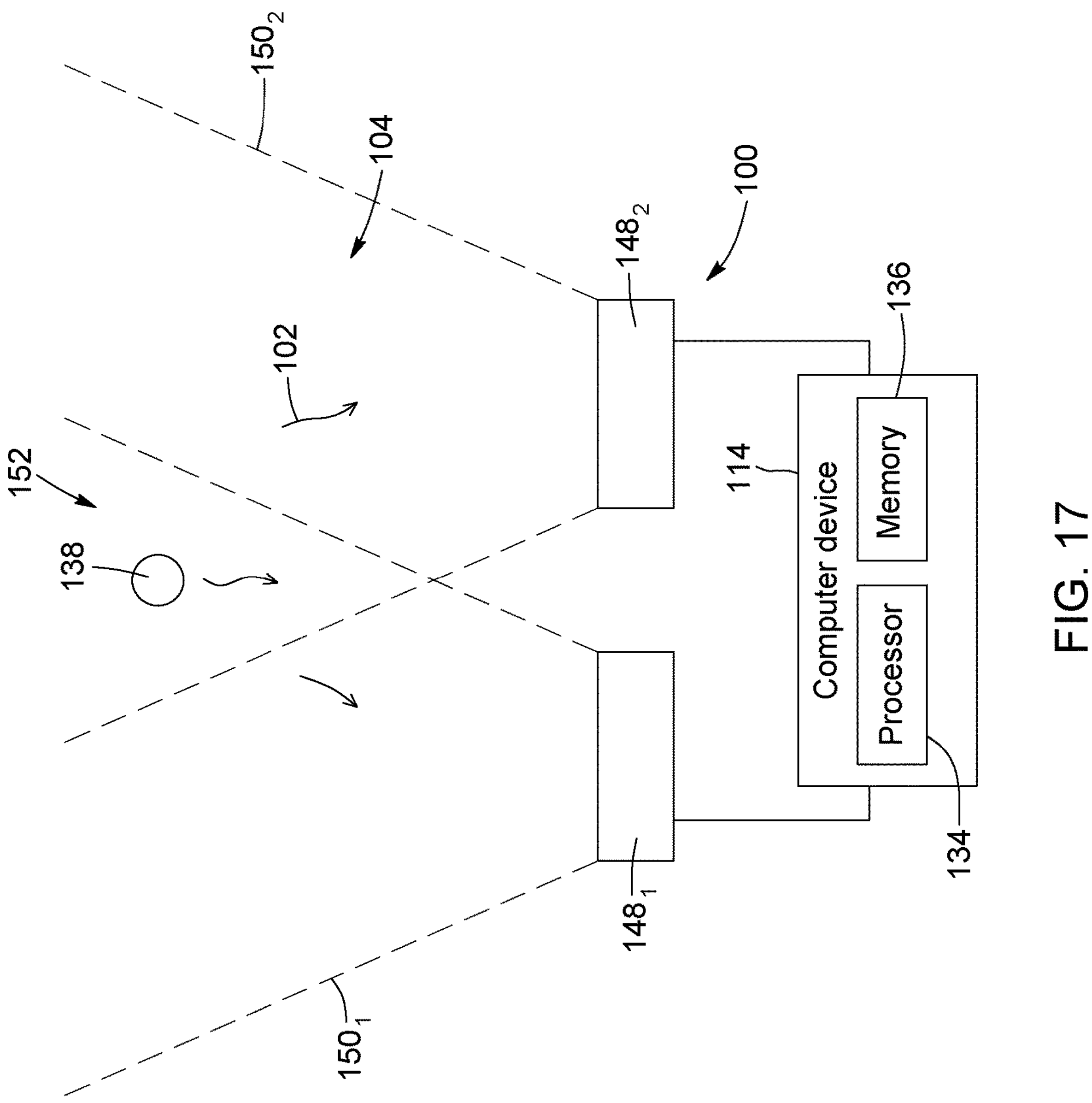
FIG. 17 is a schematic perspective view of an example of a stereoscopic depth imaging system, which can be used in the neural-network-based biometric anti-spoofing techniques disclosed herein.

In some embodiments, the depth imaging system used in the neural-network-based biometric anti-spoofing techniques disclosed herein need not be monocular. Referring to FIG. 17, there is illustrated an embodiment of a stereoscopic imaging system 100 that can be used for implementing the present techniques. The stereoscopic imaging system 100 is configured for capturing image data representative of light 102 received from a scene 104 that includes a training or test biometric object 138. The stereoscopic imaging system 100 includes a first image capture device 148$_1$ and a second capture device 148$_2$ positioned in a stereoscopic arrangement with respect to the test biometric object 138. The first and second image capture devices 148$_1$-148$_2$ may each include imaging optics disposed in front of a pixel-based image sensor. The first image capture device 148$_1$ has a first field of view 150$_1$ of the scene 104, and the second image capture device 148$_2$ has a second field of view 150$_2$ different from the first field of view 150$_1$ and overlapping with the first field of view 150$_1$ over a stereoscopic overlap region 152 of the scene 104. The biometric object 138 is located within the stereoscopic overlap region 152. The stereoscopic imaging system 100 is configured to capture a training or test image pair ($I_+$, $I_-$) of the biometric object, the training or test image pair ($I_+$, $I_-$) including a first training or test image $I_+$ and a second training or test image $I_-$. The first image capture device 148$_1$ is configured to capture the first training or test image $I_+$ and the second image capture device 148$_2$ is configured to capture the second training or test image $I_-$.

In accordance other aspects of the present description, there is provided a non-transitory computer readable storage medium having stored thereon computer readable instructions that, when executed by a processor, cause the processor to perform the methods disclosed herein of using depth imaging for training or deploying neural networks for biometric anti-spoofing.

Numerous modifications could be made to the embodiments described above without departing from the scope of the present claims.

The invention claimed is:

1. A method of training a neural network to perform image-based biometric anti-spoofing based on a training dataset comprising a set of training image pairs and a respective set of training labels, wherein each training image pair comprises a first training image and a second training image representing two different viewpoints of a training biometric object, and wherein each training label identifies whether the training biometric object associated with the respective training image pair is genuine or spoofed, the method comprising:

- training a disparity branch of the neural network for disparity map estimation, the disparity branch comprising a disparity encoder and a disparity decoder, the training comprising:
  - mapping, with the disparity encoder, each training image pair to an encoded training signal conveying disparity information associated with the training image pair; and
  - mapping, with the disparity decoder, each encoded training signal to a training disparity map associated with the respective training image pair; and
- training a classification branch of the neural network for spoofing detection, the training comprising mapping, with the classification branch, each encoded training signal outputted by the disparity encoder to a predicted spoof probability that the training biometric object associated with the respective training image pair is genuine or spoofed.

2. The method of claim 1, wherein the training biometric object comprises at least a portion of a face of a person.

3. The method of claim 1, wherein training the disparity branch is performed in an unsupervised manner without ground-truth disparity information about the set of training image pairs.

4. The method of claim 1, wherein training the disparity branch of the neural network comprises computing, for each training image pair, a reconstruction loss based on the training disparity map estimated by the disparity branch.

5. The method of claim 4, wherein computing the reconstruction loss for each training image pair comprises:

generating, from the training disparity map and one of the first and second training images, a reconstructed version of the other one of the first and second training images; and calculating the reconstruction loss based on an image similarity measure between the other one of the first and second training images and the reconstructed version thereof.

6. The method of claim 1, wherein, for each training image pair:

the disparity information conveyed by the respective encoded training signal comprises a lower-resolution sub-disparity map associated with the training image pair;

the disparity decoder comprises a hierarchy of decoding blocks corresponding to a hierarchy of scales, the hierarchy of decoding blocks being configured to receive and perform an upsampling operation on the lower-resolution sub-disparity map to generate the training disparity map, the upsampling operation comprising generating a plurality of upsampled sub-disparity maps of increasingly finer resolution by upsampling the lower-resolution sub-disparity map successively through the hierarchy of decoding blocks, the plurality of upsampled sub-disparity maps comprising a plurality of intermediate upsampled sub-disparity maps and a final upsampled sub-disparity map, the final upsampled sub-disparity map being generated by a last one of the hierarchy of decoding blocks and forming the training disparity map; and computing the reconstruction loss is further based on the lower-resolution sub-disparity map and the plurality of intermediate upsampled sub-disparity maps.

7. The method of claim 6, wherein, for each training image pair:

the disparity information conveyed by the respective encoded training signal further comprises a lower-resolution feature map pair associated with, and of coarser resolution than, the training image pair;

the upsampling operation further comprises generating a plurality of upsampled feature map pairs of increasingly finer resolution by upsampling the lower-resolution feature map pair successively through the hierarchy of decoding blocks, each upsampled feature map pair comprising a first upsampled feature map and a second upsampled feature map; and generating each intermediate upsampled sub-disparity map by the respective decoder block in the hierarchy comprises:

inputting an input sub-disparity map into the respective decoder block, the input sub-disparity map being, depending on the scale of the respective decoding block, the lower-resolution sub-disparity map or the intermediate upsampled sub- disparity map generated by the previous decoder block in the hierarchy;

upsampling the input sub-disparity map to generate a base sub-disparity map;

generating, from the base sub-disparity map and one of the first and second upsampled feature maps of the upsampled feature map pair generated by the respective decoder block, a reconstructed version of the other one of the first and second upsampled feature maps;

computing a residual sub-disparity map between the other one of the first and second upsampled feature maps and the reconstructed version thereof; and refining the base sub-disparity map using the residual sub-disparity map, to obtain the intermediate upsampled sub-disparity map.

8. The method of claim 1, wherein training the disparity branch and training the classification branch are performed as a multistage training operation comprising:

a first training stage, during which the disparity branch is pre-trained and the classification branch is not trained; and a second training stage, following the first training stage, during which the pre-trained disparity branch and the untrained classification branch are trained together.

9. The method of claim 1, wherein each training image pair was captured with an imaging system comprising an image sensor and an optical encoder disposed over the image sensor, the image sensor being configured to detect, as captured image data, light incident from the training biometric object having passed through the optical encoder, the optical encoder being configured to encode angle-of-incidence-dependent information about the incident light, and wherein the captured image data comprises:

a first set of pixel responses corresponding to a first set of pixels of the image sensor, wherein the first set of pixel responses forms the first training image of the training image pair; and a second set of pixel responses corresponding to a second set of pixels of the image sensor, the first set of pixel responses and the second set of pixel responses varying differently from each other as a function of angle of incidence, wherein the second set of pixel responses forms the second training image of the training image pair.

10. The method of claim 9, wherein the optical encoder comprises a transmissive diffraction mask (TDM), the TDM being configured to diffract the light incident from the training biometric object to generate diffracted light, the diffracted light having the angle-dependent information encoded therein for detection by the image sensor as the captured image data.

11. A non-transitory computer readable storage medium having stored thereon computer readable instructions which, when executed by a processor, cause the processor to perform a method of training a neural network to perform image-based biometric anti-spoofing in accordance with claim 1.

12. A training system for training a neural network to perform image-based biometric anti-spoofing based on a training dataset comprising a set of training image pairs and a respective set of training labels, wherein each training image pair comprises a first training image and a second training image representing two different viewpoints of a training biometric object, and wherein each training label identifies whether the training biometric object associated with the respective training image pair is genuine or spoofed, the training system comprising:

a processor; and a non-transitory computer readable storage medium operatively coupled to the processor, the non-transitory computer readable storage medium having stored thereon computer readable instructions which, when executed by the processor, cause the processor to perform operations comprising:

training a disparity branch of the neural network for disparity map estimation, the disparity branch comprising a disparity encoder and a disparity decoder, the training comprising:

mapping, with the disparity encoder, each training image pair to an encoded training signal conveying disparity information associated with the training image pair; and mapping, with the disparity decoder, each encoded training signal to a training disparity map associated with the respective training image pair; and training a classification branch of the neural network for spoofing detection, the training comprising mapping, with the classification branch, each encoded training signal outputted by the disparity encoder to a predicted spoof probability that the training biometric object associated with the respective training image pair is genuine or spoofed.

13. The training system of claim 12, further comprising an imaging system configured to capture the set of training image pairs and send the set of training image pairs to the processor, wherein the imaging system comprises an image sensor comprising an array of pixels, and an optical encoder disposed over the image sensor and having an angular response, the image sensor being configured to detect, as captured image data, light incident from the training biometric object having passed through the optical encoder, and the optical encoder being configured to encode angle-of-incidence-dependent information about the incident light, wherein the captured image data comprises, for each training image pair:

a first set of pixel responses corresponding to a first set of pixels of the array of pixels of the image sensor, wherein the first set of pixel responses forms the first training image of the training image pair; and a second set of pixel responses corresponding to a second set of pixels of the array of pixels of the image sensor, the first set of pixel responses and the second set of pixel responses varying differently from each other as a function of angle of incidence, wherein the second set of pixel responses forms the second training image of the training image pair.

14. The training system of claim 13, wherein the optical encoder comprises a transmissive diffraction mask (TDM), the TDM being configured to diffract the light incident from the training biometric object to generate diffracted light, the diffracted light having the angle-dependent information encoded therein for detection by the image sensor as the captured image data.

15. The training system of claim 13, wherein the optical encoder comprises an array of microlenses, each microlens covering at least two pixels of the image sensor.

16. A method for spoofing detection in a test biometric object, comprising:

receiving a test image pair comprising a first test image and a second test image representing two different viewpoints of the test biometric object;

mapping, using a disparity encoder of a trained neural network, the test image pair to an encoded test signal conveying disparity information associated with the test image pair, wherein the disparity encoder was trained for disparity map estimation together with a disparity decoder as a disparity branch of the neural network; and mapping, using a classification branch of the trained neural network, the encoded test signal to a predicted spoof probability that the test biometric object is genuine or spoofed, wherein the classification branch was trained for spoofing detection together with the disparity branch.

17. The method of claim 16, wherein the test biometric object comprises at least a portion of a face of a person.

18. The method of claim 16, wherein the test image pair was captured with an imaging system comprising an image sensor and an optical encoder disposed over the image sensor, the image sensor being configured to detect, as captured image data, light incident from the test biometric object having passed through the optical encoder, the optical encoder being configured to encode angle-of-incidence-dependent information about the incident light, and wherein the captured image data comprises:

a first set of pixel responses corresponding to a first set of pixels of the image sensor, wherein the first set of pixel responses forms the first test image of the test image pair; and a second set of pixel responses corresponding to a second set of pixels of the image sensor, the first set of pixel responses and the second set of pixel responses varying differently from each other as a function of angle of incidence, wherein the second set of pixel responses forms the second test image of the test image pair.

19. The method of claim 18, wherein the optical encoder comprises a transmissive diffraction mask (TDM), the TDM being configured to diffract the light incident from the test biometric object to generate diffracted light, the diffracted light having the angle-dependent information encoded therein for detection by the image sensor as the captured image data.

20. The method of claim 16, further comprising outputting a spoof detection result for the test image based on the predicted spoof probability.

21. A non-transitory computer readable storage medium having stored thereon computer readable instructions that, when executed by a processor, cause the processor to perform a method for spoofing detection in a test biometric object in accordance with of claim 16.

22. A system for spoofing detection in a test biometric object, the system comprising:

a processor; and a non-transitory computer readable storage medium operatively coupled to the processor, the non-transitory computer readable storage medium having stored thereon computer readable instructions which, when executed by the processor, cause the processor to perform operations comprising:

receiving a test image pair comprising a first test image and a second test image representing two different viewpoints of the test biometric object;

inputting the test image pair into a disparity encoder of a trained neural network, the disparity encoder being configured to map the test image pair to an encoded test signal conveying disparity information associated with the test image pair, wherein the disparity encoder was trained for disparity map estimation together with a disparity decoder as a disparity branch of the neural network; and inputting the encoded test signal into a classification branch of the trained neural network, the classification branch being configured to map the encoded test signal to a predicted spoof probability that the test biometric object is genuine or spoofed, wherein the classification branch was trained for spoofing detection together with the disparity branch.

23. The system of claim 22, further comprising an imaging system configured to capture the test image pair and send the test image pair to the processor, wherein the imaging system comprises an image sensor comprising an array of pixels, and an optical encoder disposed over the image sensor and having an angular response, the image sensor being configured to detect, as captured image data, light incident from the test biometric object having passed through the optical encoder, and the optical encoder being configured to encode angle-of-incidence-dependent information about the incident light, wherein the captured image data comprises:

a first set of pixel responses corresponding to a first set of pixels of the array of pixels of the image sensor, wherein the first set of pixel responses forms the first test image of the test image pair; and a second set of pixel responses corresponding to a second set of pixels of the array of pixels of the image sensor, the first set of pixel responses and the second set of pixel responses varying differently from each other as a function of angle of incidence, wherein the second set of pixel responses forms the second test image of the test image pair.

24. The system of claim 23, wherein the optical encoder comprises a transmissive diffraction mask (TDM), the TDM being configured to diffract the light incident from the test biometric object to generate diffracted light, the diffracted light having the angle-dependent information encoded therein for detection by the image sensor as the captured image data.

25. The system of claim 24, wherein the TDM comprises a binary phase diffraction grating comprising a series of alternating ridges and grooves extending along a grating axis at a grating period.

26. The system of claim 23, wherein the optical encoder comprises an array of microlenses, each microlens covering at least two pixels of the image sensor.

* * * * *